(12) United States Patent
Sun

(10) Patent No.: US 8,050,277 B2
(45) Date of Patent: Nov. 1, 2011

(54) CONTROL METHOD FOR THE CROSS-DOMAIN CALL AND THE CONNECTION OF ASON

(75) Inventor: Desheng Sun, Shenzhen (CN)

(73) Assignee: ZTE Corporation (CN)

( * ) Notice: Subject to any disclaimer, the term of this patent is extended or adjusted under 35 U.S.C. 154(b) by 575 days.

(21) Appl. No.: 12/161,741

(22) PCT Filed: Sep. 19, 2006

(86) PCT No.: PCT/CN2006/002444
§ 371 (c)(1),
(2), (4) Date: Jul. 22, 2008

(87) PCT Pub. No.: WO2007/085152
PCT Pub. Date: Aug. 2, 2007

(65) Prior Publication Data
US 2010/0226647 A1 Sep. 9, 2010

(30) Foreign Application Priority Data

Jan. 28, 2006 (CN) .......................... 2006 1 0002923

(51) Int. Cl.
*H04L 12/56* (2006.01)
(52) U.S. Cl. .................................. 370/395.21; 370/401
(58) Field of Classification Search .................. None
See application file for complete search history.

(56) References Cited

U.S. PATENT DOCUMENTS 7,443,831 B2 * 10/2008 Shew et al. .................... 370/351
2003/0233456 A1 * 12/2003 Shew et al. .................... 709/227

FOREIGN PATENT DOCUMENTS

CN 1710868 A 12/2005
EP 1 598 982 A1 11/2005

* cited by examiner

*Primary Examiner* — Gregory Sefcheck
*Assistant Examiner* — Daniel Mitchell
(74) *Attorney, Agent, or Firm* — Brooks Kushman P.C.

(57) ABSTRACT

The present invention discloses a control method for cross-domain call and connection of ASON. Firstly, a multi-layer network structure is constructed; a network element in parent domain corresponds to a child domain and can communicate with the network elements in the child domain; after the input $NCC_{di}$ of the bottom-layer domain $D_{di}$ receives a cross-domain call processing request from the $CCC_{c1}$ at the calling side, it sends the request up to the input $NCC_{fi}$ of the parent domain $D_{fi}$; the $NCC_{fi}$ transmits a call coordination to the output $NCC_{fo}$, and $NCC_{fo}$ sends a call indication to the $CCC_{c2}$ at the called side through the output $NCC_{do}$ corresponding to the child domain $D_{do}$; $NCC_{do}$ transfers a call confirmed to $NCC_{fi}$ via $NCC_{fo}$, and $NCC_{fi}$ transmits a connection processing request to $CC_{fi}$; $CC_{fi}$ triggers a local connection processing, and when the parent domain $CC_{f}$ performs SNC processing during this process, it needs to implement the sub-connection processing of the corresponding child domain and return the SNC Confirmed; $CC_{fi}$ returns the Connection Confirmed to $NCC_{fi}$, and then to $CCC_{c1}$ via $NCC_{di}$. The present invention solves the control problem that the present standards and techniques can not realize the cross-domain call and connection of ASON.

37 Claims, 11 Drawing Sheets

CONTROL METHOD FOR THE CROSS-DOMAIN CALL AND THE CONNECTION OF ASON

TECHNICAL FIELD

The present invention relates to the technical field of optical network, more specifically, to a control method for cross-domain call and connection in ASON.

TECHNICAL BACKGROUND

Optical networks, such as OTN (Optical Transmission Network), WDM (Wavelength-Division Multiplexing), SDH (Synchronous Digital Hierarchy) or SONET (Synchronous Optical Network), have been widely applied in telecommunication field.

ASON (Automatic Switched Optical Network) is a research hotspot in optical network field in recent years. The definition of ASON provided by ITU-TG8080 protocol implements the function of ASON by setting a specific control plane (CP). The implementation framework of distributed call and connection in ASON is specified in ITU-TG.7713 to offer an implementing criterion for automatic establishment, modification and deletion of call and connection.

A series of standards such as ITU-TG8080 set forth the concept of domain. Generally, equipments from different manufacturers construct different ASONs, namely different domains. The domains interconnect with each other via exterior network interface (called E-NNI in ITU-T standards). The users connect with these domains via the user network interface (called UNI in ITU-T standards). From the logic viewpoint, each ASON device is equipped with control members having different functions, including connection controller responsible for the control of connection and call controller responsible for the implementation of call, wherein, the call controller includes the call controller of the device at the calling side or at the called side (called CCC in ITU-T) and the call controller at the network side of ASON (called NCC in ITU-T standards).

As shown in FIG. 1, there are four interconnected ASON domains (Domain 1~4), the network elements on the boundary of the domains are responsible for the call, i.e. implementing NCC. All network elements in the domain (including those on boundary) are responsible for connection establishment, i.e. implementing CC. For brief description, CC responsible for the connection processing will be illustrated according to the need of description in the following demonstration.

Following the gradual commercialization of ASON in recent years, the need for interconnection of different ASONs is more and more urgent. However, ITU-T and other standard organizations have not developed relative interconnection standard to complete the cross-domain call and connection establishment. As shown by the dashed line in the accompanying FIG. 1, there is no relative standards and techniques to solve the problem of how to implement the call and connection between the user equipment to which $CCC_{1a}$ belongs and the user equipment to which $CCC_{4b}$ belongs via their own respective ASON domain.

SUMMARY OF THE INVENTION

The technical problem to be solved by the present invention is to offer a control method for cross-domain call and connection of ASON to overcome the problem that the current standards and techniques can not implement the control of cross-domain call and connection of ASON.

In order to solve the above technical problem, the present invention offers a control method for the cross-domain connection of ASON, wherein a multi-layer network structure including both parent domain and child domain is firstly established; there is at least one network element in the parent domain corresponding to one child domain and able to communicate with network elements in the child domain; the network elements in the parent domain are configured with parameters corresponding to the network elements in the child domain; the boundary links of the child domain are the input and output links corresponding to the network elements in the parent domain; the optical network domain without child domain is called the bottom-layer domain; each network element includes connection controller CC; one successful cross-domain connection processing includes the following steps:

(a) after the input connection controller $CC_{di}$ of the bottom-layer domain $D_{di}$ receives a Connection processing Request from the connection controller $CC_{c1}$ at the calling side and determines that the request is a cross-domain connection, it sends the request up to the input $CC_{fi}$ of the parent domain $D_{fi}$ corresponding to the domain $D_{di}$ and connected with both the resources of $CC_{c1}$ and $CC_{c2}$ at the called side;

(b) $CC_{fi}$ determines the connection routing $L_{fi}$ according to the addresses of the source and destination resources in the request, and sends a Connection Coordination message to the output $CC_{fo}$, the $CC_{fo}$ sends a Connection Indication message to the output $CC_{do}$ connected with $CC_{c2}$ resource at the called side and corresponding to the bottom-layer domain $D_{do}$ after it receives the Connection Coordination message, and then $CC_{do}$ sends the Connection Indication message to $CC_{c2}$;

(c) after $CC_{do}$ receives the connection processing message returned from $CC_{c2}$, it sends the message to the output $CC_{fo}$ of the parent domain $D_{fi}$, and from $CC_{fo}$, each $CC_f$ on the routing $L_{fi}$ performs local sub-network connection (SNC) processing successively and returns success message to the previous CC until arriving at $CC_{fi}$;

when the $CC_f$ of the parent domain having a corresponding child domain performs local SNC processing, the processing of the sub-connection between the addresses of the input and the output resources of the local domain in the child domain $D_z$ needs to be implemented;

(d) after $CC_{fi}$ implements the local SNC, it returns a connection processing success message to $CC_{c1}$ at the calling side via the input $CC_{di}$ of the bottom-layer domain $D_{di}$ to complete the cross-domain connection.

In a preferred embodiment:

When the parent domain $CC_f$ having a corresponding child domain performs the local SNC processing in said step (c), the following steps are performed:

(c1) $CC_f$ sends a SNC processing request to the input $CC_{zi}$ connected with the input resource of the corresponding child domain Dz, the request carries the addresses of the input and output resources of the child domain Dz, namely the input link and output link of the $CC_f$ on the connection routing of the parent domain;

(c2) after $CC_{zi}$ receives the SNC processing request, it determines the sub-connection routing $L_z$ according to the addresses of the input and output resources and triggers the local sub-connection processing;

(c3) after the sub-connection processing in the child domain $D_z$ is performed, $CC_{zi}$ determines that this sub-connection processing is triggered by the $CC_f$ of the parent domain and returns SNC conformation to the $CC_f$ to complete the local SNC of the parent domain $CC_f$;

In the above sub-connection processing, when CC on the sub-connection routing Lz performs the local SNC, if the CC also has its corresponding child domain, the CC is also taken as a $CC_f$ of the parent domain and the local SNC processing is performed according to the above steps (c1)~(c3).

In a preferred embodiment:

there are still other optical network domains between the parent domain $D_{fi}$ and the bottom-layer domain $D_{di}$; the messages between the input $CC_{di}$ of the bottom-layer domain and the input $CC_{fi}$ of the parent domain $D_{fi}$ and between the output $CC_{do}$ of the bottom-layer domain and the output $CC_{fo}$ of the parent domain $D_{fi}$ are transmitted layer by layer; when the CC of each child domain determines the cross-domain connection, the message is sent to the CC of the parent domain corresponding to the child domain, and the CC of each parent domain transmits the message to the CC in the corresponding child domain connected to the addresses of the source or destination resources.

In a preferred embodiment:

when the last CC on the connection routing in said parent domain or child domain receives the Connection Coordination message or Connection Indication message, it firstly determines whether the local domain connects with both $CC_{c1}$ at the calling side and the $CC_{c2}$ at the called side, if yes, the Connection Indication message is sent to the output $CC_{do}$ of the bottom-layer domain $D_{do}$ connected to the $CC_{c2}$ resource, otherwise, local SNC processing is performed and the processing result is returned to the previous CC.

In a preferred embodiment:

when the input $CC_{fi}$ of the parent domain $D_{fi}$ receives the Connection processing Request, or the input $CC_{zi}$ of the child domain receives a SNC processing request, it firstly checks whether the parameters of the request are legal and whether the local domain meets the condition described by the parameters, if yes, the subsequent connection processing is performed, otherwise a connection processing failure message is directly returned.

In a preferred embodiment:

In the process of cross-domain connection processing as described in said steps (a)~(d), if any operation fails, the subsequent connection processing will be terminated immediately, and the present CC returns a connection processing failure message to the previous CC who asks for the connection processing, and this CC directly sends the failure message to its previous CC until the failure message is returned to the CC at the calling side.

In a preferred embodiment:

said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

In order to solve the above technical problem, the present invention also offers a control method for cross-domain call and connection of ASON, wherein a multi-layer network structure including both the parent domain and the child domain is firstly constructed; there is at least one network element in the parent domain corresponding to one child domain and able to communicate with the network elements in the child domain; the network elements in the parent domain are configured with parameters of the network elements in the corresponding child domain; the boundary links of the child domain are the input and output links corresponding to the network elements in the parent domain; the optical network domain without child domain is called the bottom-layer domain; each network element includes network call controller NCC and connection controller CC; a successful cross-domain call and connection processing includes the following steps:

(A) after the input call controller $NCC_{di}$ of the bottom-layer domain $D_{di}$ receives a Call processing Request from the call controller $CCC_{c1}$ at the calling side and determines that the request is a cross-domain call request, it sends the request up to the input NCC of the parent domain $D_{fi}$ corresponding to the domain $D_{di}$ and connected with the $CCC_{c1}$ and $CCC_{c2}$ at the called side;

(B) $NCC_{fi}$ sends a Call Coordination message to the output $NCC_{fo}$ of the local domain connected with the address of the destination resource, $NCC_{fo}$ sends a Call Indication message to the output $NCC_{do}$ of the corresponding child domain $D_{do}$ connected with $CCC_{c2}$ resource at the called side after it receives the Call Coordination message, and $NCC_{do}$ sends the indication message to the $CCC_{c2}$ at the called side;

(C) after $NCC_{do}$ receives a Call Confirmed from the $CCC_{c2}$ at the called side, it sends the call confirmed message to the input $NCC_{fi}$ via the output $NCC_{fo}$ of the parent domain $D_{fi}$, $NCC_{fi}$ sends a Connection processing Request to the connection controller $CC_{fi}$ of the present network element, and the request carries the addresses of the input and output resources of the parent domain $D_{fi}$;

(D) $CC_{fi}$ determines the connection routing $L_{fi}$ according to the addresses of the input and output resources of $D_{fi}$ and triggers the local connection processing; during the local connection processing, when each $CC_f$ of the parent domain having a corresponding child domain on the routing $L_{fi}$ performs the local SNC processing, the processing of the sub-connection between the addresses of the input and output resources of the local domain needs to be implemented in the child domain and a SNC Confirmed is to be sent to $CC_f$;

(E) $CC_{fi}$ returns a Connection Confirmed to $NCC_{fi}$, the $NCC_{fi}$ returns the Connection Confirmed to the $CCC_{c1}$ at the calling side via the input $NCC_{di}$ of the bottom-layer domain $D_{di}$, ending.

In a preferred embodiment:

In said step (D), $CC_f$ performs the local SNC processing through the following steps:

(D1) $CC_f$ sends a SNC processing request to the input $CC_{zi}$ of the corresponding child domain $D_z$ connected with the input resource of $D_z$, the SNC request carries the addresses of the input and output resources of the child domain $D_z$, namely the input link and output link of the $CC_f$ on the connection routing;

(D2) after $CC_{zi}$ receives the SNC processing request, it determines the sub-connection routing $L_z$ according to the addresses of the input and output resources and triggers the local sub-connection processing;

(D3) after the sub-connection in the child domain $D_z$ is performed, $CC_{zi}$ determines that this sub-connection is triggered by the $CC_f$ of the parent domain and returns a SNC Confirmed to the $CC_f$ to complete the local SNC of the parent domain $CC_f$;

In the sub-connection processing, when the CC on the sub-connection routing $L_z$ performs the local SNC processing, if this CC has its corresponding child domain, then this CC is also taken as a parent domain $CC_f$ and the local SNC processing is performed according to the above steps (D1)~(D3).

In a preferred embodiment:

in said step (D), $CC_f$ performs the local SNC processing through the following steps:

(D1) $CC_f$ sends a SNC processing request to the input $NCC_{zi}$ of the corresponding child domain $D_z$ connected with the input resource of $D_z$, the request carries the addresses of the input and output resources of the child domain D, namely the input link and output link of the $CC_f$ on the connection routing;

(D2) after $NCC_{zi}$ receives the SNC request, it sends a sub-connection processing request to the corresponding $CC_{zi}$, the request carries the addresses of the input and output resources of the child domain $D_z$;

(D3) after $CC_{zi}$ receives the sub-connection processing request, it determines the sub-connection routing $L_z$ according to the addresses of the input and output resources and triggers the local sub-connection processing;

(D4) after the sub-connection processing in the child domain $D_z$ is performed, $CC_{zi}$ returns a Sub-Connection Confirmed to $NCC_{zi}$, the $NCC_{zi}$ determines that this sub-connection processing is triggered by the $CC_f$ of the parent domain and returns a SNC Confirmed to the $CC_f$ to complete the local SNC processing of the parent domain $CC_f$;

In the above processes of sub-connection, when the CC on the sub-connection routing $L_z$ performs the local SNC processing, if the CC has its corresponding child domain, then it is also taken as a parent domain $CC_f$ and the local SNC processing is performed according to the above steps (D1)~(D4).

In a preferred embodiment:

In said step (D), $CC_f$ performs the local SNC processing through the following steps:

(D1) $CC_f$ sends SNC processing request to the input $NCC_{zi}$ of the corresponding child domain $D_z$ connected with the input resource of D, the request carries the addresses of the input and output resources of the child domain D, namely the input link and output link of the $CC_f$ on the connection routing;

(D2) after $NCC_{zi}$ receives the SNC request, it sends a Sub-Call Coordination message to the output $NCC_{zo}$ connected to the output resource of the local domain, $NCC_{zo}$ returns a Sub-Call Confirmed message to $NCC_{zi}$, $NCC_{zi}$ sends the Sub-Connection processing Request to the corresponding $CC_{zi}$, the request carries the addresses of the input and output resources of the child domain Dz;

(D3) after $CC_{zi}$ receives the Sub-Connection processing Request, it determines the Sub-Connection routing $L_z$ according to the addresses of the input and output resources and triggers the local sub-connection processing;

(D4) after the SNC processing in the child domain Dz is performed, $CC_{zi}$ returns a Sub-Connection Confirmed message to $NCC_{zi}$, $NCC_{zi}$ determines that this sub-connection processing is triggered by the $CC_f$ of the parent domain and returns a SNC Confirmed message to the $CC_f$ to complete the local SNC processing of the parent domain $CC_f$;

In the above process of sub-connection processing, when the CC on the sub-connection routing $L_z$ performs the local SNC processing, if this CC has its corresponding child domain, then it is also taken as a parent domain $CC_f$ and the local SNC processing is performed according to the above steps (D1)~(D4).

In a preferred embodiment:

There are still other optical network domains between the parent domain $D_{fi}$ and the bottom-layer domain $D_{di}$; the messages between the input $NCC_{di}$ of the bottom-layer domain and the input $NCC_{fi}$ of the parent domain $D_{fi}$ and between the output $NCC_{do}$ of the bottom-layer domain and the output $NCC_{fo}$ of the parent domain $D_{fi}$ are transmitted layer by layer; when the NCC of each child domain determines the cross-domain connection, the message is sent to the NCC of the parent domain corresponding to the child domain, and the NCC of each parent domain transmits the message to the NCC of the corresponding child domain connected to the addresses of the source or destination resources.

In a preferred embodiment:

when the output NCC of the parent domain or child domain receives the call or Sub-Call Coordination message, it firstly determines whether the local domain connects with $CCC_{c1}$ at the calling side and the $CCC_{c2}$ at the called side, if yes, the call indication message is sent to the output $NCC_{do}$ in the bottom-layer domain $D_{do}$, otherwise, a Sub-Call Confirmed message is returned to the input NCCzi of the local domain.

In a preferred embodiment:

when the input $NCC_{fi}$ of the parent domain $D_{fi}$ receives the connection processing request, or the input $NCC_{zi}$ of the child domain receives a SNC processing request, it firstly checks whether the parameters of the request are legal and whether the local domain meets the condition described by the parameters, if yes, the subsequent connection processing is performed, otherwise a call failure message or SNC processing failure message is directly returned.

In a preferred embodiment:

in the process of cross-domain call and connection processing as described in said steps (A)~(E), if any operation fails, the subsequent process of call and connection processing will be terminated immediately, and the present NCC or CC returns a call or connection processing failure message to the previous NCC or CC who asks for the call or connection processing, and this NCC or CC directly returns the failure message to its previous NCC or CC until the failure message is returned to the CCC at the calling side.

In a preferred embodiment:

said call processing, sub-all processing, connection processing, sub-connection processing and SNC processing refer to call establishment, sub-call establishment, connection establishment, sub-connection establishment and SNC establishment; or call modification, sub-call modification, connection modification, sub-connection modification and SNC modification; or call deletion, sub-call deletion, connection deletion, sub-connection deletion and SNC deletion.

From the above description, it can be seen that the present invention introduces the parent domain on the basis of the existing domains of ASON. The invention decomposes the complicated problem of control for cross-domain call and connection into the controls for call and connection performed in each child domain and parent domain, realizes the control for cross-domain call and connection in ASON, and offers standard and technique to implement the cross-domain call and connection of ASON. The technique of the present invention has the advantages of being concise and reliable.

PREFERRED EMBODIMENTS OF THE INVENTION

The present invention will be further described in detail by referring to the preferred embodiments and the accompanying figures.

The core content of the present invention is to introduce parent domain on the basis of the existing domains of ASON according to the existing framework of the ASON network, and decompose the complicated control for cross-domain call and connection into controls for call and connection in each child domain and parent domain.

In the following, three embodiments will be illustrated according to several situations in the technical development. In the first embodiment, each child domain and parent domain applies call and connection; in the second embodiment, the top-layer parent domain applies call and connection, while other domains apply connection but not call; and in the third embodiment, both parent domain and child domain apply connection but not call, and cross-domain connection is directly got through when call is not needed.

The First Embodiment

Figure 1:
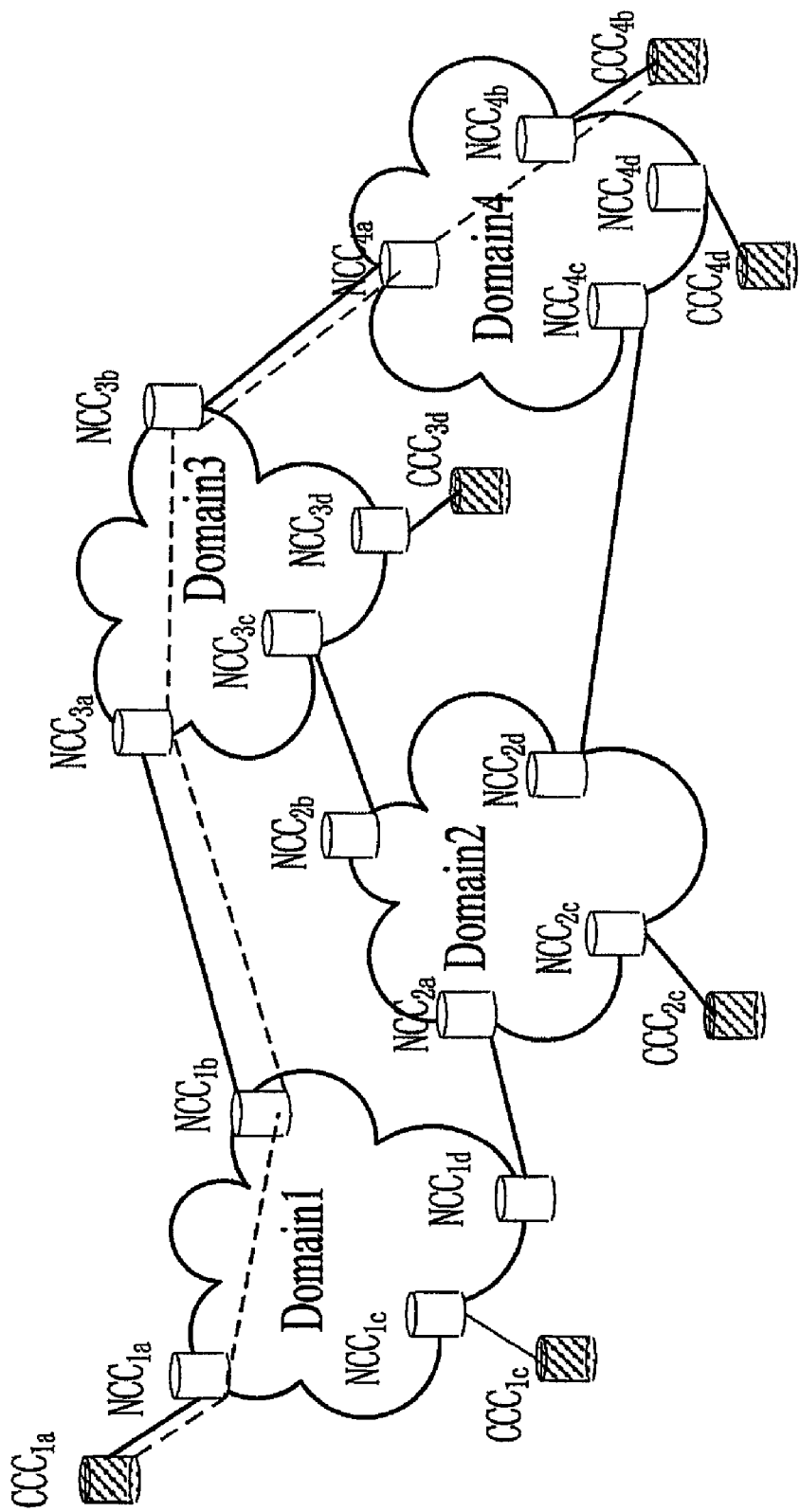
FIG. 1 is a schematic view of ASON network consisting of several interconnected ASON domains.

As shown in FIG. 1, the ASON network of the present embodiment includes four interconnected ASON domains (Domain 1–4), and the network elements on the boundary of domains are responsible for call processing, namely implementing NCC. All network elements in the domains (including the ones on the boundary) are responsible for connection establishment, namely implementing CC.

Figure 2:
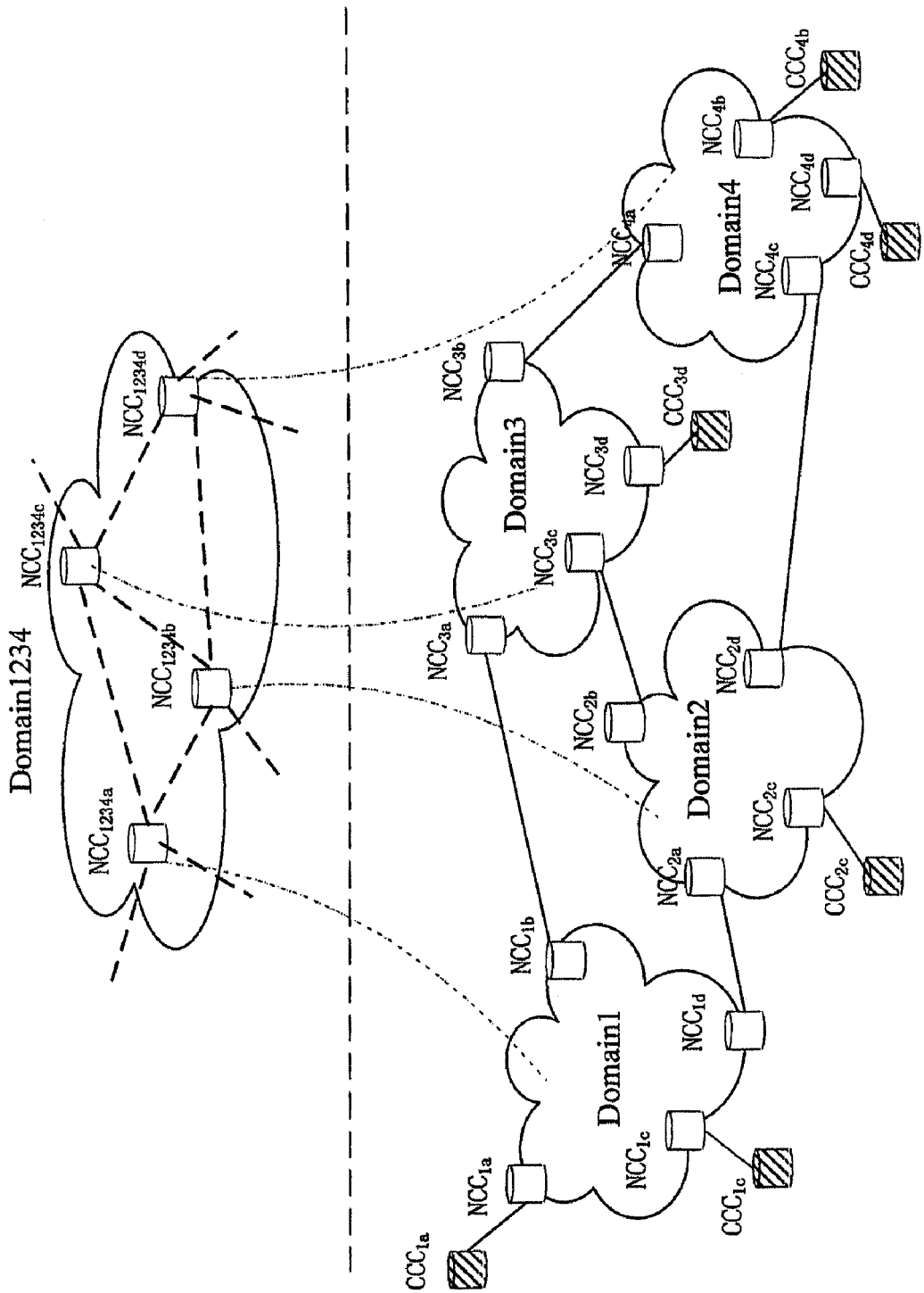
FIG. 2 is a schematic view of introducing parent domain into each domain of the ASON network shown in FIG. 1.
Figure 3:
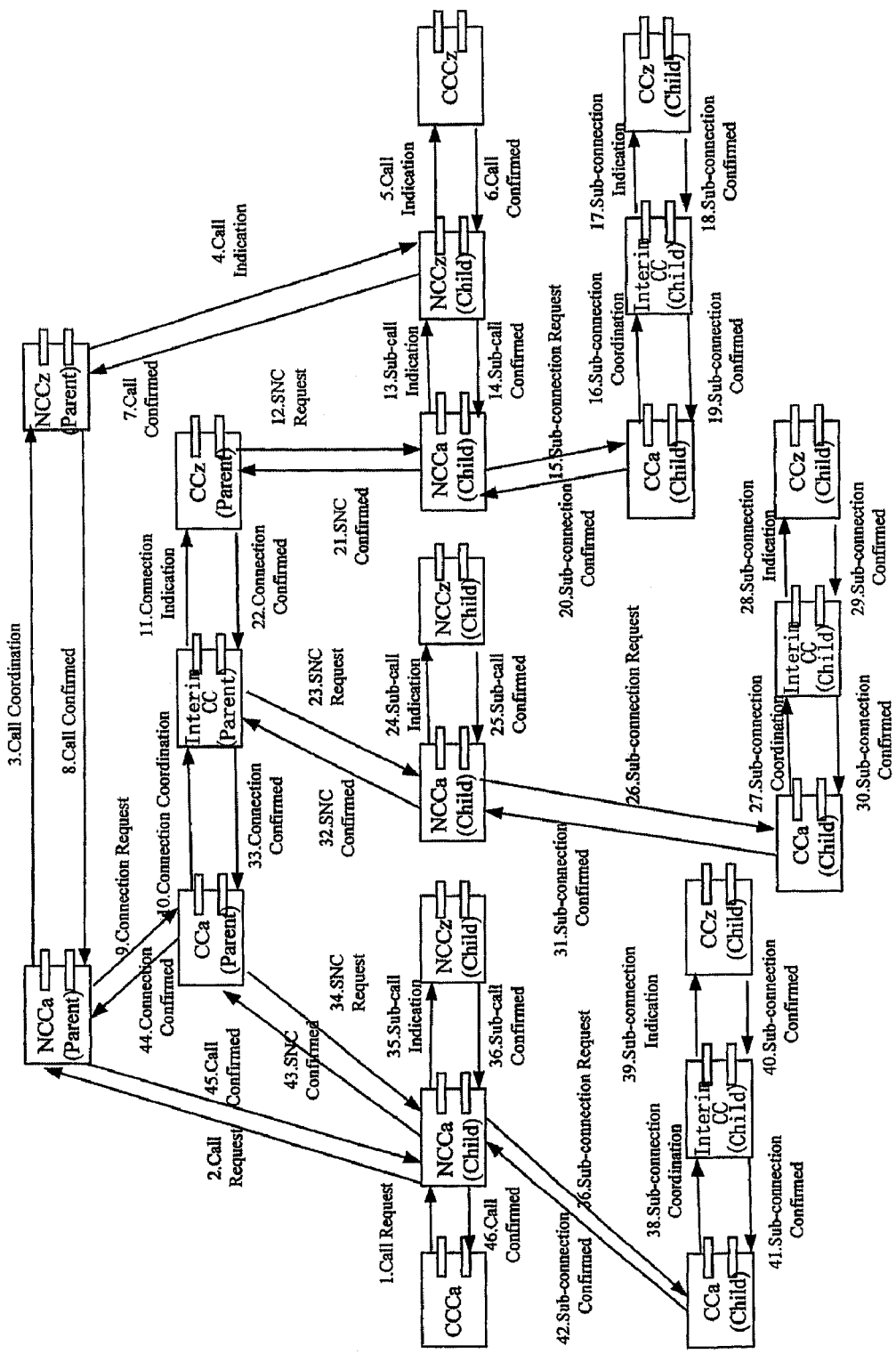
FIG. 3 shows the member interaction of cross-domain call and connection of the ASON shown in FIG. 1.
Figure 4:
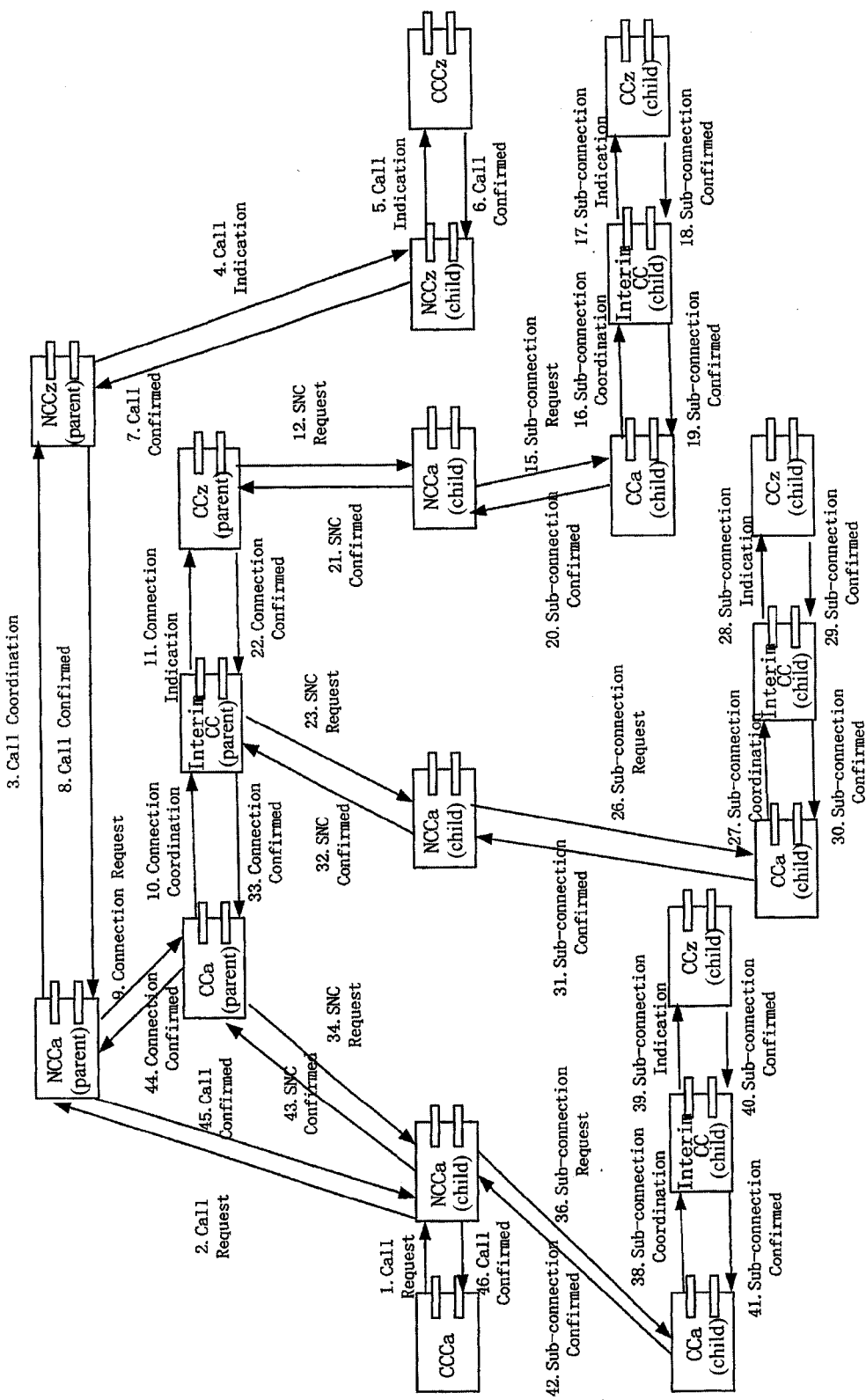
FIG. 4 shows the member interaction of cross-domain call and connection of the ASON shown in FIG. 1 when the child domain does not need the function of call.

Firstly, by referring to FIGS. 1 and 2, the specific implementation scheme of introducing parent domain in the present embodiment will be described. The scheme includes the following steps of:

Step 101, determining the boundary of Domain 1 and all boundary links in Domain 1, including $CCC_{1a}$-$NCC_{1a}$, $CCC_{1c}$-$NCC_{1c}$, $NCC_{1d}$-$NCC_{2a}$ and $NCC_{1b}$-$NCC_{3a}$, these four boundary links being input and output links of the corresponding logic network element $NCC_{1234a}$ of Domain 1;

Step 102, generating configuration parameters of the network element $NCC_{1234a}$ according to the configuration parameters (including the address of network communication, the type of protocol, etc.) of $NCC_{1a}$, $NCC_{1b}$, $NCC_{1c}$ and $NCC_{1d}$ in Domain 1;

Step 103, performing step 101 and step 102 successively for Domain 2, Domain 3 and Domain 4;

Step 104, interconnecting the certain logic network elements $NCC_{1234a}$, $NCC_{1234b}$, $NCC_{1234c}$ and $NCC_{1234d}$ corresponding to Domain1, Domain2, Domain3 and Domain4 via their own respective input and output links to make up a logic domain, namely Domain1234, as shown in FIG. 2.

According to the hierarchical relation, the above logic domain Domain1234 is called the parent domain, and the original ASON network, namely domains Domain1, Domain2, Domain3 and Domain4, are child domains.

Although the embodiment takes two-layer structure as an example, in the present invention, the logic domain Domain1234 as the parent domain and other ASON domains can also make up a upper-layer logic domain by using the same method, that is, the parent domain Domain1234 can also be a child domain of another parent domain. Therefore, this embodiment can have a multi-layer structure. For the convenience of description, the ASON domain without child domain is called as bottom-layer domain in the text. In addition, the parent domain can also have network elements not corresponding to the child domains in some peculiar conditions.

The network elements in the parent domain are logic network elements having function of ASON control plane, including call and connection control, routing control, link management, etc. The present invention only focuses on the call and connection control. All the network elements in the domain have the function of call and connection control, that is, have a NCC and a CC. The connection between the network elements in the parent domain is implemented by the links between each child domain. The implementation of the control of call and connection between the network elements in the parent domain is the same as that in the existing ASON domain.

After the ASON network having parent domain as shown in FIG. 2 is established, the implementation of cross-domain call and connection of the present invention will be described with reference to FIGS. 1, 2, 3 and 9 by taking the establishment of the cross-domain call and connection between network elements $CCC_{1a}$ and $CCC_{4b}$ at the user side as an example. Firstly, the situation where the call is successful will be described, which includes the following steps of:

Step 201, the input network element call controller $NCC_{1a}$ of the child domain Domain1 detecting a "Call Establishment Request" from the network element call controller $CCC_{1a}$ at the user side;

wherein, for the bottom-layer ASON domain, the NCC connected with the CCC at the calling side is the input network element of the call in this domain, while the corresponding network element of this bottom-layer domain in the parent domain is the input network element of the call in the parent domain.

Step 202, $NCC_{1a}$ determining that the call is a cross-domain call in this domain (child domain Domain1) according to the parameters in the Call Establishment Request (such as the address of the destination resource, the type of call, the level of protection, QoS etc.), and sending the "Call Establishment Request" to the input network element $NCC_{1234a}$ of the parent domain Domain1234;

Step 203, after $NCC_{1234a}$ detecting the Call Establishment Request and determining that it is a local domain call, it checking whether the call parameters are legal and whether the local domain meets the conditions (such as QoS) described by the call parameters, if yes, it determining that the output NCC of the local domain is the corresponding network element $NCC_{1234d}$ of the child domain Domain4 according to the address of the destination resource in the call parameters, that is, the logic link between the child domain Domain4 and the network element $CCC_{4b}$ at the user side, and sending a "Call Coordination" message to the output network element $NCC_{1234d}$;

The output NCC of call (not including the sub-call of the child domain during the establishment of SNC) in each domain is the NCC that has link connection with the called CCC in this domain.

If the network is a structure with three or more than three layers and $NCC_{1234a}$ determines that it is a cross-domain call, the "Call Establishment Request" will further be sent to the input network element of the parent domain.

Figure 9:
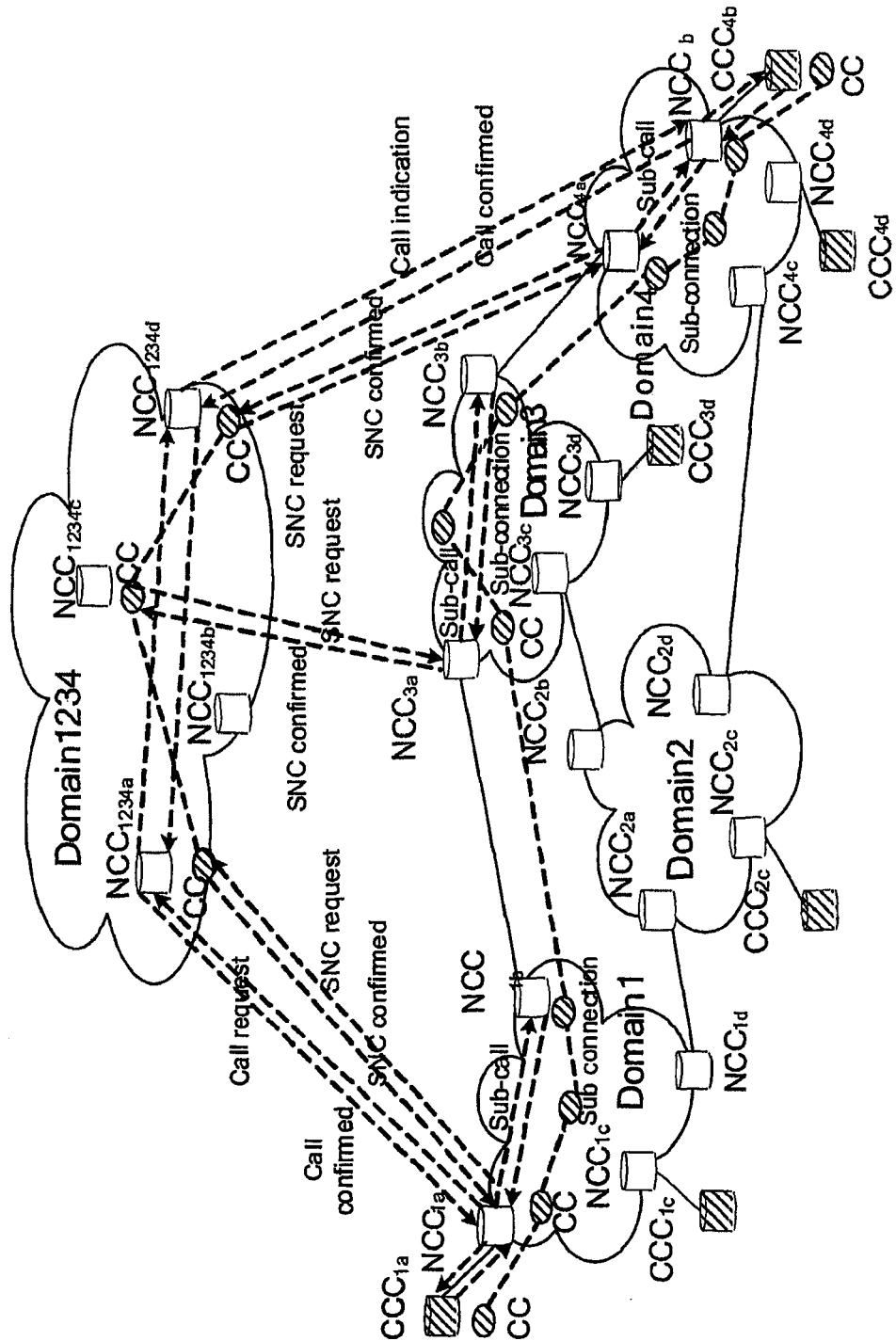
FIG. 9 is a schematic view of implementing cross-domain call and connection in the ASON shown in FIG. 1.

Step 204, the output network element $NCC_{1234d}$ determining that the resource of Domain1234 to which $NCC_{1234d}$ belongs connects with the $CCC_{1a}$ at the calling side and the $CCC_{4b}$ at the called side, generating a "Call Indication" according to the received Call Coordination message, sending the "Call Indication" to the output $NCC_{4b}$ of the child domain Domain4, and the output $NCC_{4b}$ further sending the Call indication to the network element $CCC_{4b}$ at the called user side;

Step 205, $NCC_{4b}$ detecting the returned message of the call request from CCC4b, here it is "Call Establishment Confirmed", and sending it to the output network element $NCC_{1234d}$ of the parent domain Domain1234, the $NCC_{1234d}$ sending the returned message of the call establishment request to the input $NCC_{1234a}$;

Step 206, $NCC_{1234a}$ determining that the returned message of the call request is Call Establishment Confirmed, sending a Connection Establishment Request to the connection controller CC of the network element, the request including the addresses of the input and output resources of the local domain which are the logic links between Domain1234 and $CCC_{1a}$, Domain1234 and $CCC_{4b}$ respectively;

Step 207, after the corresponding CC of $NCC_{1234a}$ receiving the Connection Establishment Request, it determining the connection routing of the local domain according to the addresses of input resource and output resources and triggering the connection establishment, the connection routing as shown in FIG. 9 being the corresponding CC of $NCC_{1234a}$-->> the corresponding CC of $NCC_{1234c}$-->> the corresponding CC of $NCC_{1234d}$; when the corresponding CC of the last logic network element $NCC_{1234d}$ on the routing establishing the local SNC (local sub-network connection), it sending a SNC establishment request to the input network element $NCC_{4a}$ of the local CC corresponding to the child domain Domain4, the request carrying the addresses of the input and output resources of the call in the child domain;

In the process of connection in the present embodiment, the corresponding CC of $NCC_{1234a}$ sends a Connection Coordination message to the corresponding CC of $NCC_{1234c}$; the CC of $NCC_{1234c}$ receives the message and sends a Connection Indication message to the corresponding CC of $NCC_{1234d}$. But the type of message is not limited in the present invention.

Step 208, $NCC_{4a}$ detecting the SNC establishment request from the corresponding CC of $NCC_{1234d}$, triggering a sub-call and checking whether the parameters are legal and whether the local domain meets the conditions (such as QoS) described by the parameters, if yes, determining that the output NCC of the local domain is $NCC_{4b}$ according to the address of the output resource of the call in the child domain, namely the link between Domain4 and $CCC_{4b}$, and sending a Sub-Call Coordination message carrying the addresses of source and destination resources of the call to the $NCC_{4b}$;

Step 209, after $NCC_{4b}$ receiving the Sub-Call Coordination message and determining that the resource of Domain4 to which $NCC_{4b}$ belongs is not connected to the calling $CCC_{1a}$, it generating the corresponding returned message, namely Sub-Call establishment Confirmed, to $NCC_{4a}$;

In order to enable $NCC_{4b}$ to determine whether the resource of the Domain4 to which $NCC_{4b}$ belongs is connected with the called or the calling, the above messages of the SNC establishment request and the Sub-Call Coordination may carry the addresses of the source and destination resources of the whole call, yet other methods can also be applied, such as step-by-step inquiry.

Step 210, when $NCC_{4a}$ determining that the returned message of the call request is Sub-Call establishment Confirmed, it sending a Sub-Connection establishment Request to the corresponding CC, the request including the addresses of the input and output resources of the child domain, namely the links between $NCC_{4a}$ of Domain4 and $NCC_{3b}$ of Domain3, $NCC_{4b}$ and $CCC_{4b}$ of Domain4;

Step 211, after the corresponding CC of $NCC_{4a}$ receiving the Sub-Connection establishment Request, it determining the connection routing according to the addresses of input and output resources and triggering the sub-connection establishment, namely the corresponding CC of $NCC_{4a}$-->> the interim CC of Domain4 (it is also possible that there is no interim CC, the same as below)-->> the corresponding CC of $NCC_{4b}$ as shown in FIG. 9; after the corresponding CC of the last NCC (i.e. $NCC_{4b}$) on the routing receiving the Sub-Connection Indication, it establishing the local SNC and sending a SNC establishment request to the transmission resource plane (called transmission plane in ITU-T standard, and its abbreviation is TP);

For the bottom-layer domain, the SNC is the cross-connection of the TP, that is, the minimal SNC.

Step 212, the corresponding CC of $NCC_{4b}$ sending Sub-Connection establishment Confirmed to the interim CC of Domain4; after the interim CC of Domain4 establishing the local SNC, it sending Sub-Connection establishment Confirmed to the corresponding CC of $NCC_{4a}$; and after the CC of $NCC_{4a}$ completing the local SNC establishment, it returning the Sub-Connection establishment Confirmed to the $NCC_{4a}$;

Step 213, $NCC_{4a}$ determining that the triggering condition of the local sub-call is the triggering of the CC of Domain1234, and sending SNC Confirmed to the corresponding CC of $NCC_{1234d}$;

Step 214, the corresponding CC of $NCC_{1234d}$ returning Connection establishment Confirmed to the corresponding CC of $NCC_{1234c}$;

Step 215, the corresponding CC of $NCC_{1234c}$ receiving the Connection establishment Confirmed, and sending the SNC establishment Request to the input $NCC_{3a}$ of the local CC corresponding to the child domain Domain3 when establishing the local SNC, the request carrying the addresses of the input and output resources of the call in this child domain;

Step 216, after $NCC_{3a}$ detecting the SNC establishment Request, it implementing the call and connection in Domain3, the process is the same as that in Domain4 and will not be repeated here;

Step 217, after $NCC_{3a}$ receiving the Connection establishment Confirmed from the corresponding CC, it determining that the triggering condition of the local call is the triggering of the CC of Domain1234, and returning SNC Confirmed to the corresponding CC of $NCC_{1234c}$;

Step 218, the corresponding CC of $NCC_{1234c}$ returning Connection establishment Confirmed to the corresponding CC of $NCC_{1234a}$;

Step 219, after the corresponding CC of $NCC_{1234a}$ receiving the Connection establishment Confirmed, sending the SNC establishment Request to the input $NCC_{1a}$ of the local CC corresponding to the child domain Domain1 when establishing the local SNC, the request carrying the addresses of the input and output resources of the call in this child domain;

Step 220, after $NCC_{1a}$ detecting the SNC establishment Request, it implementing the call and connection in Domain1, the process is the same as that in Domain4 and will not be repeated here;

Step 221, after $NCC_{1a}$ receiving the Connection establishment Confirmed from the corresponding CC, it determining that the triggering condition of the local call is the triggering of the CC of Domain1234, and returning SNC Confirmed to the corresponding CC of $NCC_{1234a}$;

Step 222, the corresponding CC of $NCC_{1234a}$ returning Connection establishment Confirmed to the $NCC_{1234a}$, $NCC_{1234a}$ returning the Call establishment Confirmed to $CCC_{1a}$ via the $NCC_{1a}$ of Domain1, completing the cross-domain call and connection establishment.

As shown in FIG. 9, after the above establishment processes of call and connection are completed, a service channel consisting of the in-domain links in the bottom-layer domains Domain1, Domain3 and Domain4 and the inter-domain links between the bottom-layer domains is established between the corresponding CC of $CCC_{1a}$ and the corresponding CC of $CCC_{4b}$.

The above processes of in-domain call (or sub-call) and connection (or sub-connection) in parent domain Domain1234 and child domains Domain1, Domain3 and Domain4 are basically the same as that specified in the prior art. As for the parent domain, only the establishment process of SNC needs to be implemented by its child domains; while for the child domain, it is characterized in that the SNC establishment request from the CC in the parent domain triggers the call and connection, and correspondingly the SNC Confirmed message needs to be returned to the CC of the parent domain.

The Second Embodiment

Figure 10:
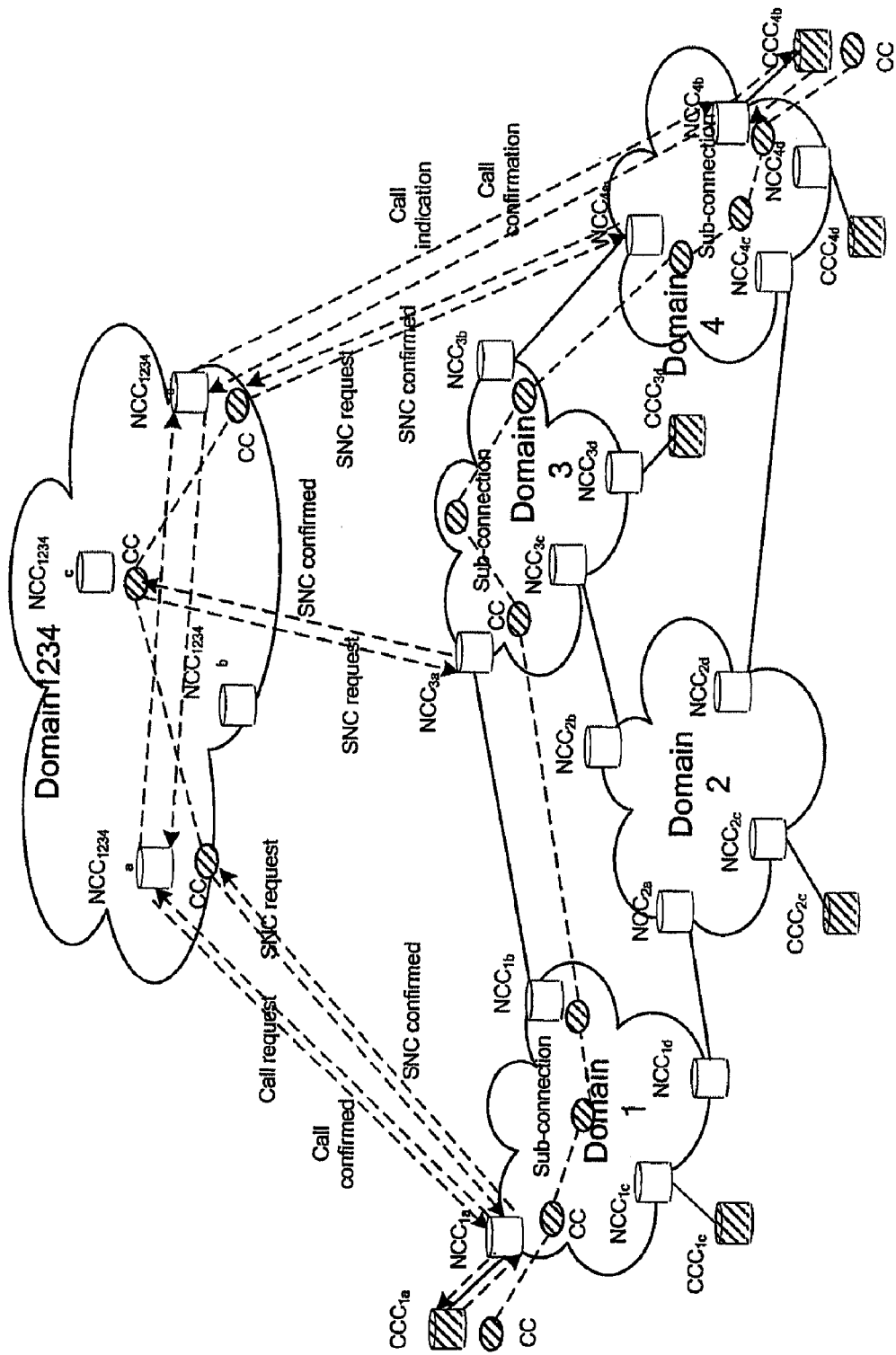
FIG. 10 is a schematic view of implementing cross-domain call and connection in the ASON shown in FIG. 1 when the child domain does not need the function of call.

The network structure of this embodiment is the same as that of the first embodiment. In the following, the specific implementation scheme of establishing a cross-domain call and connection when the call is needed only by the top-layer parent domain will be described with reference to FIGS. 2, 4, 7 and 10 by taking the establishment of the cross-domain call and connection between the network elements $CCC_{1a}$ and $CCC_{4b}$ at the user side as an example. The situation where the call is successful will be described first, which includes the following steps of:

Step 301~Step 307 are the same as Step 201~Step 207 in the first embodiment, at the time, $NCC_{1234a}$ has received the Call establishment Confirmed from the called $CCC_{4b}$, and it sends Connection establishment Request to the corresponding CC. This CC determines the connection routing to be the corresponding CC of $NCC_{1234a}$-->> the corresponding CC of $NCC_{1234c}$-->> the corresponding CC of $NCC_{1234d}$; when the connection establishment is triggered and the corresponding CC of $NCC_{1234d}$ establishes the local SNC, the SNC establishment request will be sent to the input $NCC_{4a}$ of the child domain Domain4, and the request carries the addresses of the input and output resources of the call in the child domain;

Step 308, after $NCC_{4a}$ detecting the SNC establishment request, it sending a Sub-Connection establishment Request to the corresponding CC, the request carrying the addresses of the input and output resources of the domain, namely the links between $NCC_{4a}$ of Domain4 and $NCC_{3b}$ of Domain3, and $CCC_{4b}$ and $NCC_{4b}$ of Domain4;

Step 309, after the corresponding CC of $NCC_{4a}$ receiving the Sub-Connection establishment Request, it determining the connection routing according to the addresses of input and output resources, namely the corresponding CC of $NCC_{4a}$-->> the interim CC of Domain4-->> the corresponding CC of $NCC_{4b}$ as shown in FIG. 10, and triggering the sub-connection establishment; after the corresponding CC of the last NCC on the routing, i.e. $NCC_{4b}$, receiving the Sub-Connection Indication, it establishing the local SNC and sending the SNC request to the TP;

Step 310, the corresponding CC of $NCC_{4b}$ sending Sub-Connection establishment Confirmed to the interim CC of Domain4; after the interim CC of Domain4 establishing the local SNC, sending the Sub-Connection establishment Confirmed to the corresponding CC of $NCC_{4a}$, the CC of $NCC_{4a}$ performing the local SNC and returning the Sub-Connection establishment Confirmed to the $NCC_{4a}$;

Step 311, $NCC_{4a}$ determining that the triggering condition of the local connection is the triggering of the CC of Domain1234, and sending SNC establishment Confirmed to the corresponding CC of $NCC_{1234d}$;

Step 312, the corresponding CC of $NCC_{1234d}$ returning the Connection establishment Confirmed to the corresponding CC of $NCC_{1234c}$;

Step 313, after the corresponding CC of $NCC_{1234c}$ receiving the Connection establishment Confirmed, it sending the SNC establishment Request to the input network element $NCC_{3a}$ of the local CC corresponding to the child domain Domain3 when establishing the local SNC, and the request carrying the addresses of the input and output resources of the call in the child domain;

Step 314, after $NCC_{3a}$ detecting the SNC establishment Request, it implementing the sub-connection in Domain3, the process is the same as that in Domain4 and will not be repeated here;

Step 315, after $NCC_{3a}$ receiving the Sub-Connection establishment Confirmed from the corresponding CC, it determining that the local connection is triggered by the CC of the Domain1234, and returning SNC Confirmed to the corresponding CC of $NCC_{1234c}$;

Step 316, the corresponding CC of $NCC_{1234c}$ returning Connection establishment Confirmed to the corresponding CC of $NCC_{1234a}$;

Step 317, the corresponding CC of $NCC_{1234a}$ receiving the Connection establishment Confirmed, sending the SNC establishment Request to the input network element $NCC_{1a}$ of the local CC corresponding to the child domain Domain1 when establishing the local SNC, and the request carrying the addresses of the input and output resources of the call in the child domain;

Step 318, after $NCC_{1a}$ detecting the SNC establishment Request, it implementing sub-connection in Domain1, the process is the same as that in Domain4 and will not be repeated here;

Step 319, after $NCC_{1a}$ receiving the Sub-Connection establishment Confirmed from the corresponding CC, it determining that the local connection is triggered by the CC of the Domain1234, and returning SNC Confirmed to the corresponding CC of $NCC_{1234a}$;

Step 320, the corresponding CC of $NCC_{1234a}$ returning Connection establishment Confirmed to $NCC_{1234a}$, the $NCC_{1234a}$ returning the Call establishment Confirmed to $CCC_{1a}$ via the $NCC_{1a}$ of Domain1, and completing the cross-domain call and connection establishment.

The difference of the present embodiment from the first embodiment is that, in the process of the NCC of the parent domain establishing SNC, the input NCC of the child domain will not initiate sub-call when receiving SNC establishment Request, instead, it will directly send Sub-Connection establishment Request to the corresponding CC. The other processes are the same as those of the first embodiment.

In the above two embodiments, before the corresponding CC of the input NCC of the parent domain or child domain triggers the connection or the sub-connection establishment, it can also firstly check whether the parameters of the connection request are legal and whether the local domain meets the conditions described by the parameters, if yes, the connection or sub-connection establishment is to be performed.

The Third Embodiment

The difference of the network structure of the present embodiment from that of the first embodiment is that the network elements of the ASON of each child domain and the parent domain may have no call controller NCC.

Figure 5:
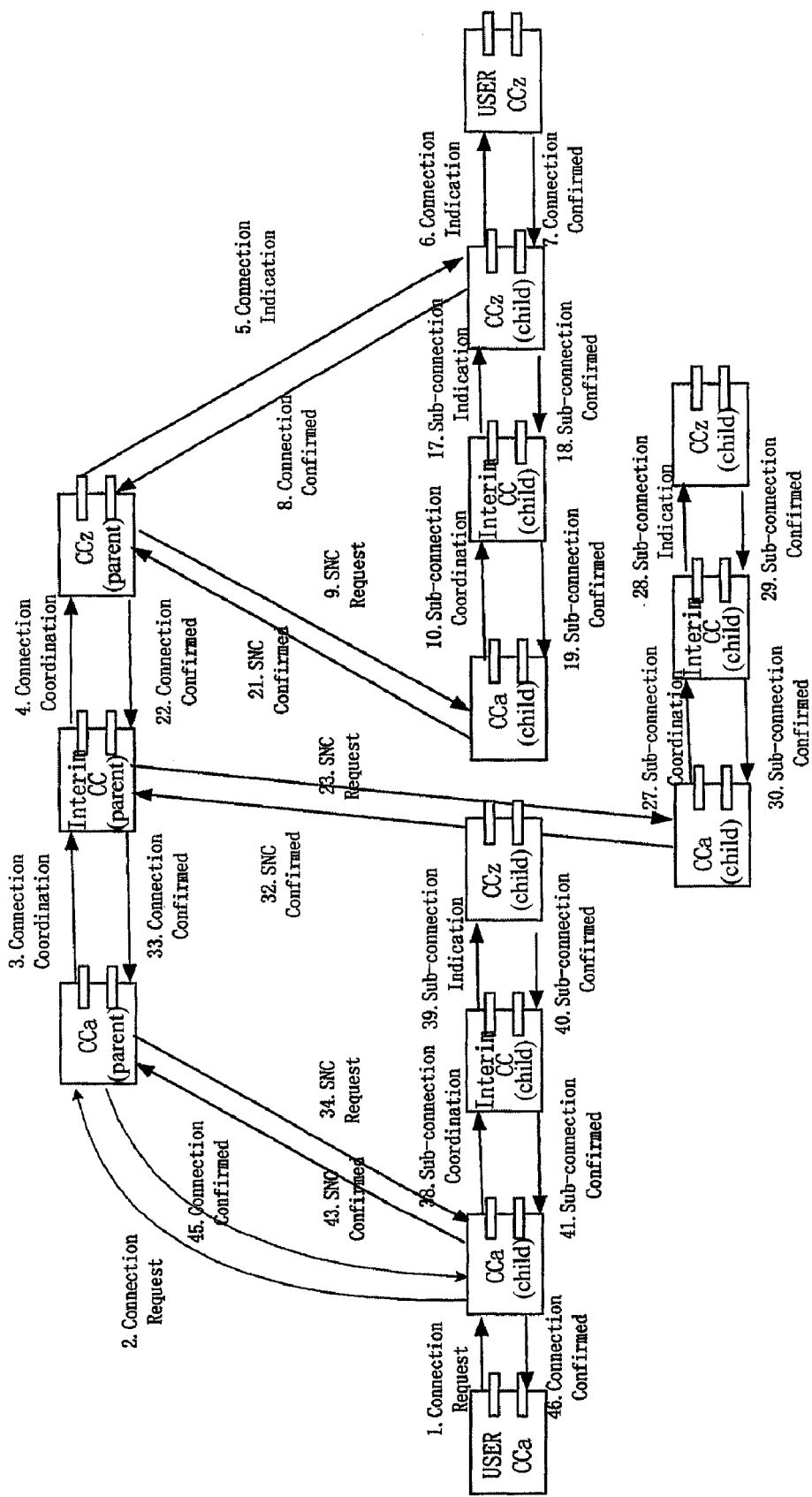
FIG. 5 shows the member interaction of cross-domain connection of the ASON shown in FIG. 1 when the ASON does not need the function of call.
Figure 6:
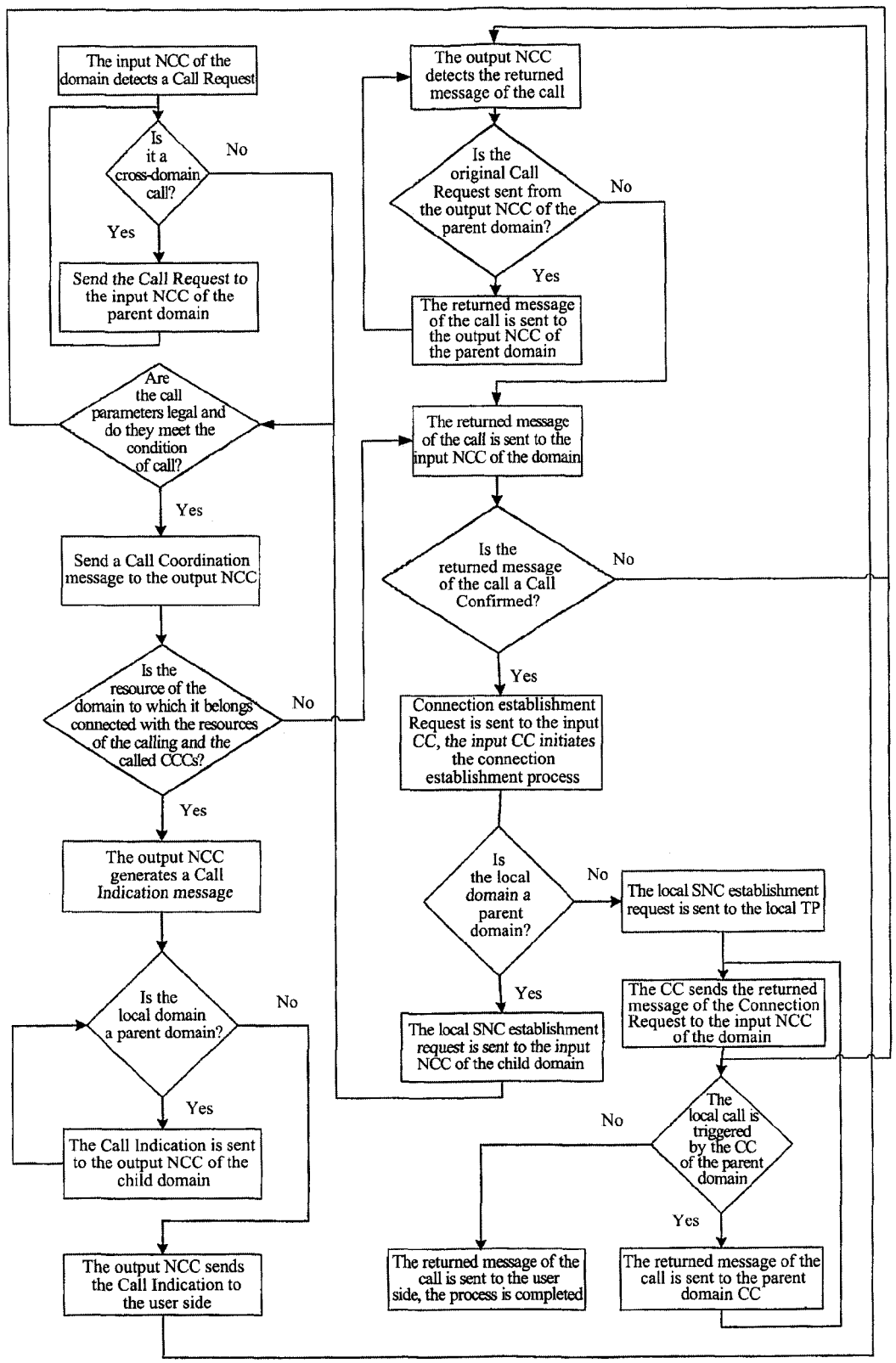
FIG. 6 is a flow chart of implementing cross-domain call and connection corresponding to the member interaction shown in FIG. 3.
Figure 7:
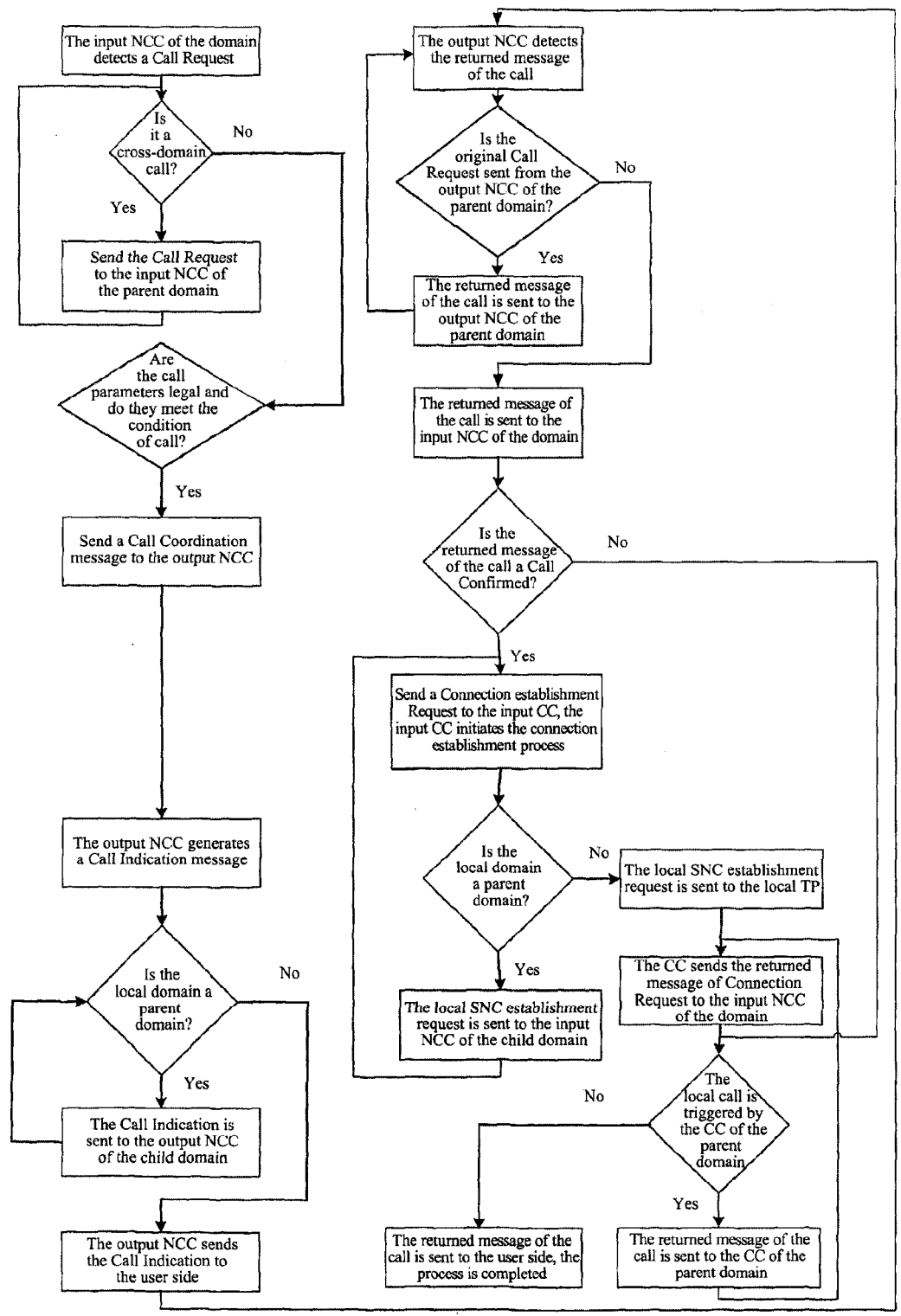
FIG. 7 is a flow chart of implementing cross-domain call and connection corresponding to the member interaction shown in FIG. 4 when the child domain does not need the function of call.
Figure 8:
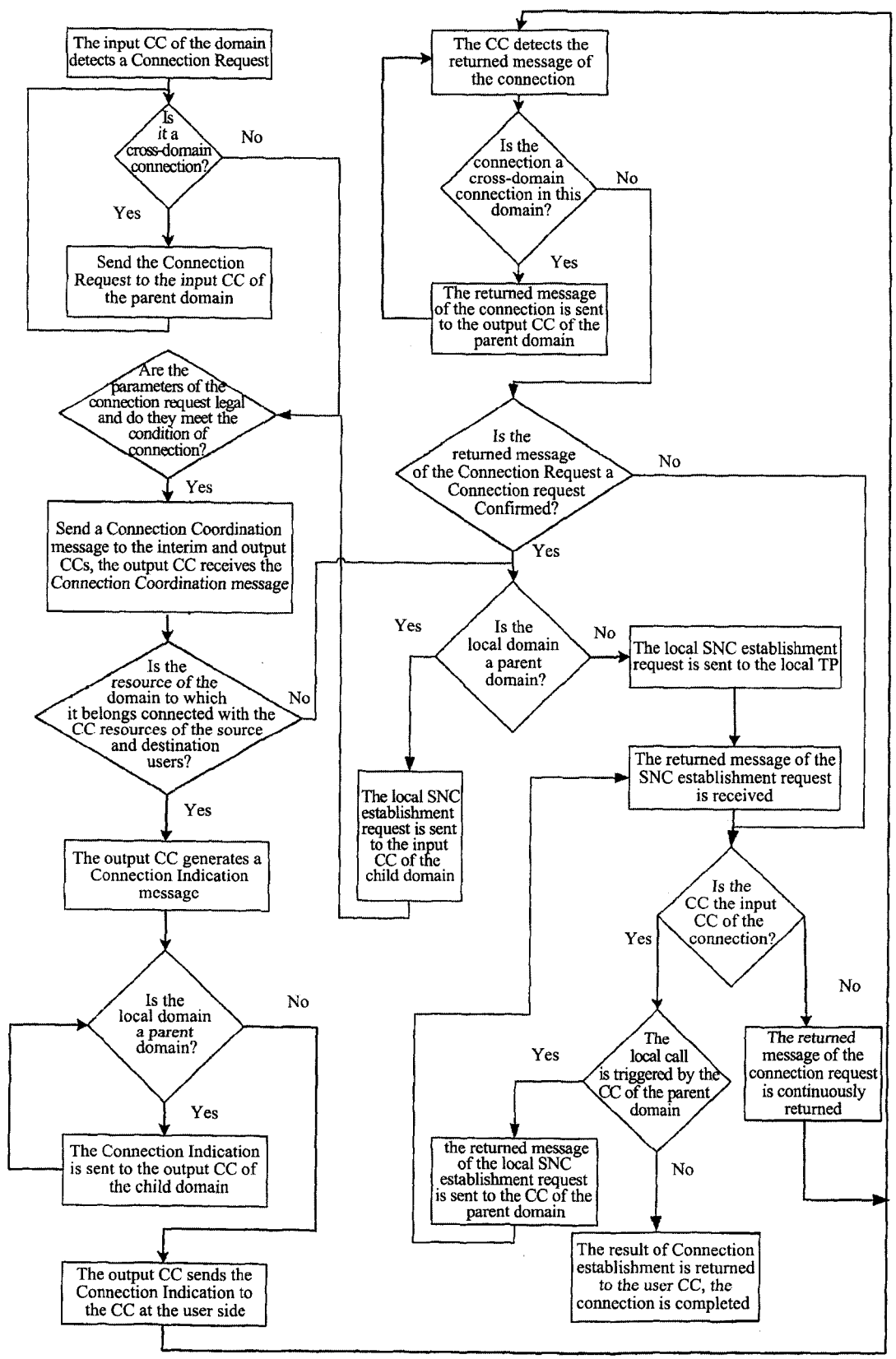
FIG. 8 is a flow chart of implementing cross-domain connection corresponding to the member interaction shown in FIG. 5 when ASON does not need the function of call.
Figure 11:
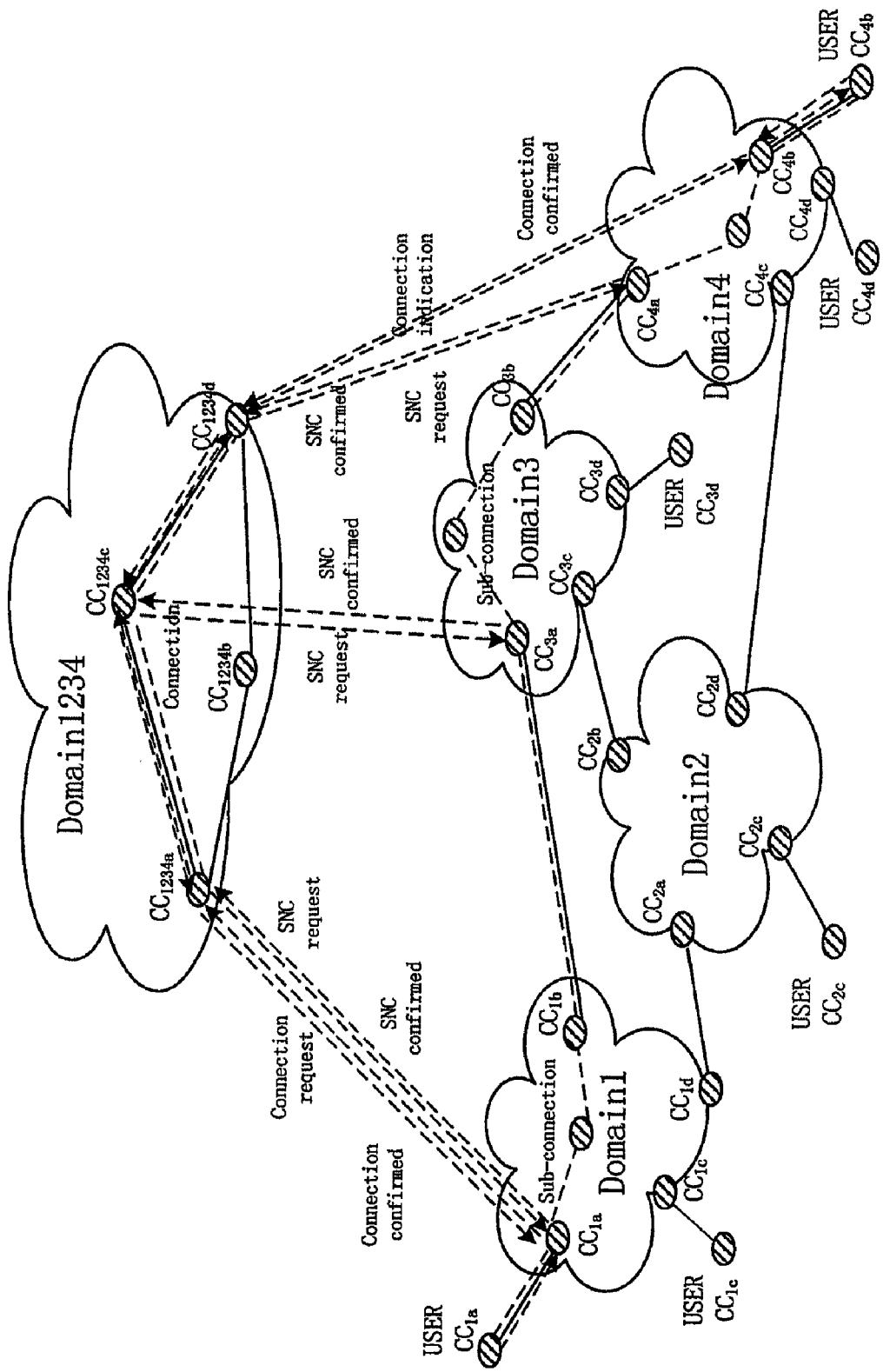
FIG. 11 is a schematic view of implementing cross-domain connection in the ASON shown in FIG. 1 when the ASON does not need the function of call.

In the following, the specific implementation scheme of establishing a cross-domain connection when call is not needed will be described with reference to FIGS. 5, 8 and 11 by taking the establishment of cross-domain connection between the network elements $CC_{1a}$ and $CC_{4b}$ at the user side as an example. The situation when the call is successful will be described, which includes the following steps of:

Step 401, the connection controller $CC_{1a}$ of the input network element of the child domain Domain1 detecting a "Connection establishment Request" from the connection controller of the user side network element USER $CC_{1a}$;

Step 402, the $CC_{1a}$ determining that the connection in this domain (child domain Domain1) is a cross-domain connection according to the parameters in the Call Request, then sending the Connection establishment Request to the connection controller $CC_{1234a}$ of input network element (namely the corresponding network element of the child domain in the parent domain) of the parent domain Domain1234;

Step 403, after $CC_{1234a}$ detecting the Connection establishment Request and determining that it is the local call, it checking whether the parameters of the Connection Request are legal and whether the local domain (parent domain Domain1234) meets the conditions described by the parameters, if yes, determining the connection routing according to the address of the source resource (namely the logic link between Domain1234 and USER $CC_{1a}$) and the address of the destination resource (namely the logic link between Domain1234 and USER $CC_{4b}$) carried in the parameters, and triggering the connection; the connection routing as shown in FIG. 11 being $CC_{1234a}$-->> $CC_{1234c}$-->> $CC_{1234d}$; $CC_{1234a}$ generating a Connection Coordination message and sending it to the output $CC_{1234d}$ via the interim $CC_{1234c}$;

If the network is a structure with three or more than three layers and $NCC_{1234a}$ determines that it is a cross-domain connection, the "Connection establishment Request" will be further sent to the input network element of the parent domain.

The output CC of the connection (not including the sub-connection of child domain during the establishment of SNC) in each domain is the link-connected CC between the local domain and the called CC.

Step 404, after $CC_{1234d}$ receiving the Connection Coordination message from $CC_{1234a}$ and determining that the domain it belongs to (the parent Domain1234) connects with the related resources of the source and the destination USER CC (USER $CC_{1a}$ and USER $CC_{4b}$), it generating a Connection Indication message according to the received Connection Coordination message and sending the Connection indication to the USER $CC_{4b}$ at the user side via the output $CC_{4b}$ of the child domain Domain4;

Step 405, after $CC_{4b}$ detecting the Connection establishment Confirmed message returned from the user side, it determining that this connection is a cross-domain call in the local domain (Domain4) and sending the message to the corresponding network element $CC_{1234d}$ of the parent domain Domain1234;

Step 406, when $CC_{1234d}$ receiving the Connection establishment Confirmed, it triggering the establishment of the local SNC and sending SNC establishment Request to the input $CC_{4a}$ of the local CC corresponding to the child domain Domain4, and the request carrying the addresses of the input and output resources of the child domain, which are the input link (approximate to the calling side) and the output link (approximate to the called side) connected to the $CC_{1234d}$ on the connection routing of the parent domain respectively;

Step 407, after the $CC_{4a}$ receiving the SNC Request, it firstly checking whether the parameters of the SNC Request are legal and whether the local domain meets the conditions described by the parameters, if yes, determining the connection routing according to the addresses of the input and output resources, the connection routing as shown in FIG. 11 being $CC_{4a}$-->> the interim CC of Domain4 (maybe not existing)-->> $CC_{4b}$, and triggering the sub-connection establishment; after $CC_{4b}$ receiving the Sub-Connection Indication, it determining that the domain it belongs to is not connected with the related resources of the source and the destination USER CC simultaneously, then establishing the local SNC and sending the SNC establishment Request to the TP;

The CCs connected to the input and the output resources of the child domain are the input CC and output CC of the child domain respectively.

Step 408, $CC_{4b}$ sending the Sub-Connection establishment Confirmed to the interim CC of the Domain4; after the CC establishing the local SNC, it sending the Sub-Connection establishment Confirmed to $CC_{4a}$ which will establish the local SNC;

Step 409, $CC_{4a}$ determining that the local sub-connection is triggered by the $CC_{1234d}$ of the Domain1234 and returning SNC Confirmed to $CC_{1234d}$;

Step 410, $CC_{1234d}$ returning Connection establishment Confirmed to the $CC_{1234c}$;

Step 411, after the $CC_{1234c}$ receiving the Connection establishment Confirmed, it triggering and implementing the establishment of the local SNC, and sending the SNC establishment Request to the input $CC_{3a}$ of the local CC corresponding to the child domain Domain3, and the $CC_{3a}$ implementing the sub-connection establishment in the Domain3 in the same way as that in Domain4;

Step 412, after $CC_{3a}$ receiving the returned Connection establishment Confirmed and implementing the local SNC establishment, it determining that the local sub-connection is triggered by the $CC_{1234c}$ of the Domain1234 and returning SNC Confirmed to $CC_{1234c}$;

Step 413, the $CC_{1234c}$ returning the Connection establishment Confirmed to the $CC_{1234a}$;

Step 414, the $CC_{1234a}$ receiving the Connection establishment Confirmed, triggering the local SNC establishment and sending the SNC establishment Request to the input $CC_{1a}$ of the local CC corresponding to the child domain Domain1, the $CC_{1a}$ implementing the sub-connection establishment in the Domain1 in the same way as that in Domain4;

Step 418, after $CC_{1a}$ receiving the returned Sub-Connection establishment Confirmed and implementing the local SNC establishment, it determining that the local sub-connection is triggered by the $CC_{1234a}$ of the Domain 1234 and returning SNC Confirmed to $CC_{1234a}$;

Step 419, the $CC_{1234a}$ returning Connection establishment Confirmed to the USER $CC_{1a}$ via $CC_{1a}$, and completing the cross-domain connection establishment.

In this embodiment, the processing of in-domain connection of the parent domain or the child domain is basically the same as that in the prior art, whereas the implementation of CC establishing the local SNC in the parent domain is different.

The above three embodiments only describe the situation where the call or connection is successful. The whole process of call or connection will fail if any of the following situations happens:

A, the input NCC (or CC) of the domain checks the parameters of call (or connection, including SNC) request and finds that they are illegal.

B, the input NCC (or CC) of the domain determines that the local domain does not meet the condition described by the parameters of the call (or connection, including SNC) request.

C, the connection establishment between each CC fails.

D, the call establishment between each NCC fails.

E, the process in each CC or NCC fails.

The failure situations are not limited to the above ones. When any step during the call or connection fails, the current NCC or CC will immediately stop the subsequent processing, such as connection, call (including sub-connection and sub-call), and the connection processing failure information will be returned to the previous NCC or CC which asks for the call or connection processing. The CC directly returns the connection failure information to its previous network element until the failure information is returned to the CC at the calling side. After the NCC or CC of the parent domain or the child domain receives the failure message, it directly returns the information to its previous one, and does not perform the establishment of the connection or local SNC or other processing.

In addition, the present invention also includes the modification and deletion of cross-domain call and connection besides the above-described establishment of cross-domain call and connection. The implementation schemes of modification and deletion of the cross-domain call and connection are substantially the same as that of the above-mentioned establishment of cross-domain call and connection, they can be obtained by only changing the "Establishment" of the call, sub-call, connection, sub-connection and SNC in the above described embodiments to "Modification" or "Deletion".

In another embodiment, on the basis of the second embodiment, when establishing the local SNC in parent domain CC, the SNC establishment Request can also be directly sent to the input CC of the corresponding child domain, and the CC triggers and implements the local sub-connection, rather than firstly sending the SNC Request to the input NCC of the child domain and the NCC being responsible for sending the Sub-Connection establishment Request to its corresponding CC as described in the second embodiment.

From the above specific embodiments, it can be seen that the implementation schemes of the present invention decompose the complicated problem of control for a cross-domain call and connection into the controls for call and connection in the parent domain and each child domain by introducing the parent domain on the basis of existing ASON domains, so that the invention eventually solves the problem of control for cross-domain call and connection, and has the advantages of being concise and reliable.

INDUSTRIAL APPLICABILITY

The present invention can be used in ASON. It decomposes the complicated problem of control for a cross-domain call and connection into the controls for call and connection in the parent domain and each child domain, and eventually solves the problem of control for cross-domain call and connection of ASON.

I claim:

1. A control method for cross-domain connection of Automatic Switched Optical Network, wherein a multi-layer network structure including both parent domain and child domain is firstly established; there is at least one network element in the parent domain corresponding to one child domain and able to communicate with network elements in the child domain; the network element in the parent domain is configured with parameters of the network elements in the corresponding child domain; boundary links of the child domain are input and output links of the corresponding network element in the parent domain; the optical network domain without child domain is called bottom-layer domain; each network element includes a connection controller CC; one successful cross-domain connection processing includes the following steps of:

(a) an input connection controller $CC_{di}$ of a bottom-layer domain $D_{di}$ receiving a Connection processing Request from a connection controller $CC_{c1}$ at calling side and determining that the request is a cross-domain connection, sending the request up to an input $CC_{fi}$ corresponding to the domain $D_{di}$ in the parent domain $D_{ft}$ that connects with both resources of the $CC_{c1}$ and a $CC_{c2}$ at called side;

(b) $CC_{fi}$ determining a connection routing $L_{ft}$ according to addresses of source and destination resources in the request, and sending a Connection Coordination message to an output $CC_{fo}$, the $CC_{fo}$ receiving the message and sending a Connection Indication message to an output $CC_{do}$ connected with $CC_{c2}$ resource at the called side in the corresponding bottom-layer domain $D_{do}$, and then $CC_{do}$ sending the Connection Indication message to $CC_{c2}$;

(c) $CC_{do}$ receiving a connection processing message returned from $CC_{c2}$ and sending it to the output $CC_{fo}$ of the parent domain $D_{ft}$, and from $CC_{fo}$, each $CC_f$ on the routing $L_{ft}$ performing local sub-network connection SNC processing successively and returning a success message to the previous CC until arriving at $CC_{fi}$;

when the $CC_f$ of the parent domain having a corresponding child domain performs local SNC processing, the processing of a sub-connection between the addresses of the input and the output resources of local domain in the child domain $D_z$ needs to be implemented;

(d) after $CC_{fi}$ completing the local SNC, it returning a connection processing success message to $CC_{c1}$ at the calling side via the input $CC_{di}$ of the bottom-layer domain $D_{di}$ to complete the cross-domain connection;

wherein, when the parent domain $CC_f$ having a corresponding child domain performs the local SNC processing in said step (c), the following steps are performed:

(c1) $CC_f$ sending SNC processing request to an input $CC_{zi}$, connected with the input resource of the corresponding child domain $D_z$, the request carrying the addresses of input and output resources of the child domain $D_z$, namely the input link and output link of the $CC_f$ on the connection routing of the parent domain;

(c2) after $CC_{zi}$, receiving the SNC processing request, it determining a sub-connection routing $L_z$ according to the addresses of the input and output resources and triggering the local SNC processing;

(c3) after completing the SNC processing in the child domain D, $CC_{zi}$, determining that this SNC processing is triggered by the $CC_f$ of the parent domain and returning SNC Confirmed to the $CC_f$ to complete the local SNC processing of the parent domain $CC_{fi}$;

in the above sub-connection processing, when the CC on the sub-connection routing $L_z$ performs the local SNC processing, if the CC also has its corresponding child domain, it is also taken as a $CC_f$ of the parent domain, and the local SNC processing is performed according to the above steps (c1)~(c3).

2. The method of claim 1, characterized in that:
there are still other optical network domains between the parent domain $D_{fi}$ and the bottom-layer domain $D_{di}$; the messages between the input $CC_{di}$, of the bottom-layer domain and the input $CC_{fi}$ of the parent domain $D_{fi}$ as well as between the output $CC_{do}$ of the bottom-layer domain and the output $CC_{fo}$ of the parent domain $D_{fi}$ are transmitted layer by layer; when the CC of each child domain determines the cross-domain connection, the message is sent to the CC of the parent domain corresponding to the child domain, and the CC of each parent domain transmits the message to the CC in the corresponding child domain connected to the addresses of the source or destination resources.

3. The method of claim 2, characterized in that:
in the cross-domain connection processing as described in said steps (a)~(d), if any operation fails, the subsequent connection processing will be terminated immediately, and the present CC will return the connection processing failure message to the previous CC who asks for the connection processing, and this CC directly sends the failure message to its previous CC until the failure message is returned to the CC at the calling side.

4. The method of claim 2, characterized in that:
said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

5. The method of claim 1, characterized in that:
when the last CC on the connection routing in the parent domain or the child domain receives the Connection Coordination message or the Connection Indication message, it firstly determines whether the local domain connects with both the $CC_{c1}$ at the calling side and the $CC_{c2}$ at the called side, if yes, the Connection Indication message is sent to the output $CC_{do}$ of the bottom-layer domain $D_{do}$ connected to the $CC_{c2}$ resource, otherwise, local SNC processing is performed and the processing result is returned to the previous CC.

6. The method of claim 5, characterized in that:
in the cross-domain connection processing as described in said steps (a)~(d), if any operation fails, the subsequent connection processing will be terminated immediately, and the present CC will return the connection processing failure message to the previous CC who asks for the connection processing, and this CC directly sends the failure message to its previous CC until the failure message is returned to the CC at the calling side.

7. The method of claim 5, characterized in that:
said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

8. The method of claim 1, characterized in that:
when the input $CC_{fi}$ of the parent domain $D_{fi}$ receives a Connection processing Request or the input $CC_{zi}$, of the child domain receives a SNC processing request, it firstly checks whether the parameters of the request are legal and whether the local domain meets the condition described by the parameters, if yes, the subsequent connection processing is performed, otherwise a connection processing failure message is directly returned.

9. The method of claim 8, characterized in that:
in the cross-domain connection processing as described in said steps (a)~(d), if any operation fails, the subsequent connection processing will be terminated immediately, and the present CC will return the connection processing failure message to the previous CC who asks for the connection processing, and this CC directly sends the failure message to its previous CC until the failure message is returned to the CC at the calling side.

10. The method of claim 8, characterized in that:
said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

11. The method of claim 1, characterized in that:
in the cross-domain connection processing as described in said steps (a)~(d), if any operation fails, the subsequent connection processing will be terminated immediately, and the present CC will return the connection processing failure message to the previous CC who asks for the connection processing, and this CC directly sends the failure message to its previous CC until the failure message is returned to the CC at the calling side.

12. The method of claim 1, characterized in that:
said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

13. The method of claim 1, characterized in that:
in the cross-domain connection processing as described in said steps (a)~(d), if any operation fails, the subsequent connection processing will be terminated immediately, and the present CC will return the connection processing failure message to the previous CC who asks for the connection processing, and this CC directly sends the failure message to its previous CC until the failure message is returned to the CC at the calling side.

14. The method of claim 1, characterized in that:
said connection processing, sub-connection processing and SNC processing are connection establishment, sub-connection establishment and SNC establishment; alternatively, said connection processing, sub-connection processing and SNC processing are connection modification, sub-connection modification and SNC modification; alternatively, said connection processing, sub-connection processing and SNC processing are connection deletion, sub-connection deletion and SNC deletion.

15. A control method for cross-domain call and connection of ASON, wherein a multi-layer network structure including both parent domain and child domain is firstly constructed; there is at least one network element in the parent domain corresponding to one child domain and able to communicate with the network elements in the child domain; the network element in the parent domain is configured with parameters of the network elements in the corresponding child domain; boundary links of the child domain are input and output links of the corresponding network element in the parent domain; the optical network domain without child domain is called bottom-layer domain; each network element includes a network call controller NCC and a connection controller CC; a successful cross-domain call and connection processing includes the following steps of:
  (A) an input call controller $NCC_{di}$ of a bottom-layer domain $D_{di}$ receiving a Call processing Request from a call controller $CCC_{c1}$ at calling side and determining that the request is a cross-domain call, sending the request up to an input $NCC_{fi}$ corresponding to the domain $D_{di}$ in the parent domain $D_{fi}$ that connects with both resources of the $CCC_{c1}$ and a $CCC_{c2}$ at called side;
  (B) $NCC_{fi}$ sending a Call Coordination message to an output $NCC_{fo}$ of local domain connected with address of destination resource, the $NCC_{fo}$ receiving the message and sending a Call Indication message to an output $NCC_{do}$ of corresponding child domain $D_{do}$ connected with $CCC_{c2}$ resource at the called side, and the $NCC_{do}$ sending the indication message to $CCC_{c2}$ at the called side;
  (C) $NCC_{do}$ receiving a Call Confirmed from the $CCC_{c2}$ at the called side and sending the Call Confirmed to the input $NCC_{fi}$ via the output $NCC_{fo}$ of the parent domain $D_{fi}$, $NCC_{fi}$ sending a Connection processing Request to the connection controller $CC_{fi}$ of the present network element, and the request carrying the addresses of input and output resources of the parent domain $D_{fi}$;
  (D) $CC_{fi}$ determining connection routing $L_{fi}$ according to the addresses of the input and output resources of $D_{fi}$ and triggering the local connection processing; during this process, when each $CC_f$ of the parent domain having a corresponding child domain on the routing $L_{fi}$ performs local sub-network connection SNC processing, the processing of a sub-connection between the addresses of the input and output resources of the local domain needing to be performed in the child domain, and SNC Confirmed being returned to $CC_f$;
  (E) $CC_{fi}$ returning a Connection Confirmed to the $NCC_{fi}$, then the $NCC_{fi}$ returning the Connection Confirmed to the $CCC_{c1}$ at the calling side via the input $NCC_{di}$, of the bottom-layer domain $D_{di}$, ending;
wherein, in said step (D), $CC_f$ performs the local SNC processing through the following steps of:
  (D1) $CC_f$ sending a SNC processing request to the input $CC_{zi}$, of the corresponding child domain $D_z$, connected with the input resource of $D_z$, and the request carrying the addresses of the input and output resources of the child domain $D_z$, namely input link and output link of the $CC_f$ on the connection routing;
  (D2) after $CC_{zi}$, receiving the SNC processing request, it determining the sub-connection routing $L_z$ according to the addresses of the input and output resources and triggering the local sub-connection processing;
  (D3) after the sub-connection processing in the child domain $D_z$ being completed, $CC_{zi}$ determining that this sub-connection processing is triggered by the $CC_f$ of the parent domain and returning a SNC Confirmed to the $CC_f$ to complete the local SNC processing of the parent domain $CC_f$;
in the sub-connection processing, when the CC on the sub-connection routing $L_z$, performs the local SNC processing, if this CC has its corresponding child domain, then it is also taken as a parent domain $CC_f$ and the local SNC processing is performed according to the above steps (D1)~(D3).

16. The control method of claim 15, characterized in that:
in said step (D), $CC_f$ performs the local SNC processing through the following steps of:
  (D1) $CC_f$ sending SNC processing request to the input $NCC_{zi}$ of the corresponding child domain $D_z$ connected with the input resource of $D_z$, and the request carrying the addresses of the input and output resources of the child domain $D_z$, namely the input link and output link of the $CC_f$ on the connection routing;
  (D2) after $NCC_{zi}$ receiving the SNC request, it sending a sub-connection processing request to the corresponding $CC_z$, the request carrying the addresses of the input and output resources of the child domain $D_z$;
  (D3) after $CC_{zi}$ receiving the sub-connection processing request, it determining the sub-connection routing $L_z$ according to the addresses of the input and output resources and triggering the local sub-connection processing;
  (D4) after completing the sub-connection processing in the child domain $D_z$, $CC_{zi}$ returning a Sub-Connection Confirmed to $NCC_{zi}$, then the $NCC_{zi}$ determining that this sub-connection processing is triggered by the $CC_f$ of the parent domain and returning a SNC Confirmed to the $CC_f$ to complete the local SNC processing of the parent domain $CC_f$;
In the above sub-connection processing, when the CC on the sub-connection routing $L_z$ performs the local SNC processing, and if the CC has its corresponding child domain, then it is also taken as a parent domain $CC_f$ and the local SNC processing is performed according to the above steps (D1)~(D4).

17. The method of claim 16, characterized in that:
when the input $NCC_{fi}$ of the parent domain $D_{fi}$ receives the connection processing request, or the input $NCC_{zi}$ of the child domain receives the SNC processing request, it firstly checks whether the parameters of request are legal and whether the local domain meets the condition described by the parameters, if yes, the subsequent connection processing is performed, otherwise a call failure message or SNC processing failure message is directly returned.

18. The method of claim 16, characterized in that:
in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

19. The method of claim 16, characterized in that: id sa call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

20. The control method of claim 15, characterized in that: in said step (D), $CC_f$ performs the local SNC processing through the following steps of:
(D1) $CC_f$ sending a SNC processing request to the input $NCC_{zi}$ of the corresponding child domain $D_z$ connected with the input resource of the child domain, and the request carrying the addresses of the input and output resources of the child domain $D_z$, namely the input link and output link of the $CC_f$ on the connection routing;
(D2) after $NCC_{zi}$ receiving the SNC request, it sending a sub-call coordination message to the output $NCC_{zo}$ connected to the output resource of the local domain, then the $NCC_{zo}$ returning a Sub-call Confirmed message to $NCC_{zi}$, and the $NCC_{zi}$ sending a sub-connection processing request to the corresponding $CC_{zi}$, and the request carrying the addresses of the input and output resources of the child domain $D_z$;
(D3) after $CC_{zi}$ receiving the sub-connection processing request, it determining the sub-connection routing $L_z$ according to the addresses of the input and output resources and triggering the local sub-connection processing;
(D4) after completing the sub-connection processing in the child domain $D_z$, $CC_{zi}$ returning a Sub-Connection Confirmed message to $NCC_{zi}$, then the $NCC_{zi}$ determining that this sub-connection processing is triggered by the $CC_f$ of the parent domain and returning a SNC Confirmed message to the $CC_f$ to complete the local SNC processing of the parent domain $CC_f$;
In the above process of sub-connection processing, when the CC on the sub-connection routing $L_z$ performs the local SNC, if the CC has its corresponding child domain, then it is also taken as a parent domain $CC_f$ and the local SNC processing is performed according to the above steps (D1)~(D4).

21. The method of claim 20, characterized in that: when the output NCC of the parent domain or the child domain receives the call or sub-call coordination message, it firstly determines whether the local domain connects with $CCC_{c1}$ at the calling side and the $CCC_{c2}$ at the called side, if yes, a call indication message is sent to the output $NCC_{do}$ in the bottom-layer domain $D_{do}$, otherwise, a Sub-call Confirmed message is returned to the input $NCC_{zi}$ of the local domain.

22. The method of claim 20, characterized in that: when the input $NCC_{fi}$ of the parent domain $D_{fi}$ receives the connection processing request, or the input $NCC_{zi}$ of the child domain receives the SNC processing request, it firstly checks whether the parameters of request are legal and whether the local domain meets the condition described by the parameters, if yes, the subsequent connection processing is performed, otherwise a call failure message or SNC processing failure message is directly returned.

23. The method of claim 20, characterized in that: in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

24. The method of claim 20, characterized in that: said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

25. The method of claim 15, characterized in that: there are still other optical network domains between the parent domain $D_{fi}$ and the bottom-layer domain $D_{di}$; the messages between the input $NCC_{di}$ of the bottom-layer domain and the input $NCC_{fi}$ of the parent domain $D_{fi}$ as well as between the output $NCC_{do}$ of the bottom-layer domain and the output $NCC_{fo}$ of the parent domain $D_{fi}$ are transmitted layer by layer; when the NCC of each child domain determines the cross-domain connection, the message is sent to the NCC of the parent domain corresponding to the child domain, and the NCC of each parent domain transmits the message to the NCC of the corresponding child domain connected to the address of source or destination resource.

26. The method of claim 25, characterized in that: in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

27. The method of claim 25, characterized in that: said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

28. The method of claim 15, characterized in that:
when the output NCC of the parent domain or the child domain receives the call or sub-call coordination message, it firstly determines whether the local domain connects with $CCC_{c1}$ at the calling side and the $CCC_{c2}$ at the called side, if yes, a call indication message is sent to the output $NCC_{do}$ in the bottom-layer domain $D_{do}$, otherwise, a Sub-call Confirmed message is returned to the input $NCC_{zi}$ of the local domain.

29. The method of claim 28, characterized in that:
in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

30. The method of claim 28, characterized in that:
said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

31. The method of claim 15, characterized in that:
when the input $NCC_{fi}$ of the parent domain $D_{fi}$ receives the connection processing request, or the input $NCC_{zi}$ of the child domain receives the SNC processing request, it firstly checks whether the parameters of request are legal and whether the local domain meets the condition described by the parameters, if yes, the subsequent connection processing is performed, otherwise a call failure message or SNC processing failure message is directly returned.

32. The method of claim 31, characterized in that:
in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

33. The method of claim 31, characterized in that:
said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

34. The method of claim 15, characterized in that:
in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

35. The method of claim 15, characterized in that:
said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

36. The method of claim 15, characterized in that:
in the process of cross-domain call and connection processing as described in said steps (A)~(E), if any operation fails, the subsequent call or connection processing will be terminated immediately, and the present NCC or CC returns the call or connection processing failure message to the previous NCC or CC who asks for the call or connection processing, and this NCC or CC directly sends the failure message to its previous NCC or CC until the failure message is returned to the CCC at the calling side.

37. The method of claim 15, characterized in that:
said call processing, sub-call processing, connection processing, sub-connection processing and SNC processing are call establishment, sub-call establishment, connection establishment, sub-connection establishment and SNC establishment; alternatively, said call processing, sub-call processing, connection processing, sub-connection processing and SNC processing are call modification, sub-call modification, connection modification, sub-connection modification and SNC modification; alternatively, said call processing, sub-call processing, connection processing, sub-connection processing and SNC processing are call deletion, sub-call deletion, connection deletion, sub-connection deletion and SNC deletion.

* * * * *

UNITED STATES PATENT AND TRADEMARK OFFICE
CERTIFICATE OF CORRECTION

PATENT NO.        : 8,050,277 B2                                            Page 1 of 1
APPLICATION NO.   : 12/161741
DATED             : November 1, 2011
INVENTOR(S)       : Desheng Sun It is certified that error appears in the above-identified patent and that said Letters Patent is hereby corrected as shown below:

Column 21, Line 4, Claim 19:

After "characterized in that: "
Delete "id sa" and
Insert -- said --.

Signed and Sealed this
Fourteenth Day of February, 2012

David J. Kappos
*Director of the United States Patent and Trademark Office*